US012709224B2

(12) United States Patent
Du et al.

(10) Patent No.: US 12,709,224 B2
(45) Date of Patent: Aug. 18, 2026

(54) STEP, STEP DEVICE AND VEHICLE

(71) Applicant: T-MAX (HANGZHOU) TECHNOLOGY CO., LTD., Hangzhou (CN)

(72) Inventors: Xinfa Du, Hangzhou (CN); Ke Wang, Hangzhou (CN); Yiming Wang, Hangzhou (CN); Hanxin Zhang, Hangzhou (CN); Qi Zhang, Hangzhou (CN); Songfeng Wang, Hangzhou (CN); Yongyong Zhan, Hangzhou (CN)

(73) Assignee: T-MAX (HANGZHOU) TECHNOLOGY, CO., LTD., Zhejiang (CN)

( * ) Notice: Subject to any disclaimer, the term of this patent is extended or adjusted under 35 U.S.C. 154(b) by 369 days.

(21) Appl. No.: 18/496,787

(22) Filed: Oct. 27, 2023

(65) Prior Publication Data

US 2025/0128662 A1 Apr. 24, 2025

(30) Foreign Application Priority Data

Oct. 18, 2023 (CN) ......................... 202311351803.7
Oct. 18, 2023 (CN) ......................... 202322797446.9

(51) Int. Cl.
*B60R 3/02* (2006.01)

(52) U.S. Cl.
CPC ...................................... *B60R 3/02* (2013.01)

(58) Field of Classification Search
CPC ........................................................ B60R 3/02
See application file for complete search history.

(56) References Cited

U.S. PATENT DOCUMENTS

| | | | |
|---|---|---|---|
| 7,591 | A | 8/1850 | Burdett |
| 634,385 | A | 10/1899 | Wolfe et al. |
| 724,155 | A | 3/1903 | Besse |
| 752,031 | A | 2/1904 | Chadwick |

(Continued)

FOREIGN PATENT DOCUMENTS

| | | |
|---|---|---|
| CA | 1021826 | 11/1977 |
| CA | 2082177 | 5/1994 |

(Continued)

OTHER PUBLICATIONS

International Search Report and Written Opinion of the International Searching Authority for PCT International Application No. PCT/CN2015/097930 mailed May 10, 2016.

(Continued)

*Primary Examiner* — James A Shriver, II
(74) *Attorney, Agent, or Firm* — Ashurst Perkins Coie US LLP

(57) ABSTRACT

A step, a step device and a vehicle are provided. The step includes a plurality of step segments, at least one connection step segment and a fastener, adjacent step segments include a first step segment and a second step segment, a first end of the connection step segment is slidably and detachably connected to the first step segment, a second end of the connection step segment is slidably and detachably connected to the second step segment, and the fastener is configured to fasten the connection step segment and the first step segment and to fasten the connection step segment and the second step segment.

16 Claims, 16 Drawing Sheets

(56) References Cited

U.S. PATENT DOCUMENTS 817,224 A 4/1906 Clifford
955,658 A 4/1910 Mitchell et al.
1,063,643 A 6/1913 Blake et al.
1,169,140 A 1/1916 Fassett et al.
1,176,538 A 3/1916 Warner
1,182,169 A 5/1916 Hansen
1,222,127 A 4/1917 Perri
1,239,892 A 9/1917 Dunderdale
1,242,828 A 10/1917 Lyle
1,250,604 A 12/1917 Lorenc
1,268,335 A 6/1918 Fairchild
1,364,697 A 1/1921 Branch
1,437,648 A 12/1922 Gore
1,449,031 A 3/1923 Blake
1,471,972 A 10/1923 Miller
1,509,235 A 9/1924 Giuliani
1,621,479 A 3/1927 Cleveland et al.
1,755,942 A 4/1930 Woolson
1,800,162 A 4/1931 Stroud
2,029,745 A 2/1936 Stiner
2,041,640 A 5/1936 Goss
2,118,557 A 5/1938 Hamilton
2,122,040 A 6/1938 Machovec
2,125,085 A 7/1938 Pool
2,197,266 A 4/1940 Fredell
2,209,576 A 7/1940 McDonald
2,246,986 A 6/1941 Pellegrini
2,436,961 A 3/1948 Gabriel
2,487,921 A 11/1949 Culver
2,492,068 A 12/1949 Schofield et al.
2,566,401 A 9/1951 Bustin
2,575,615 A 11/1951 Crump
2,583,894 A 1/1952 Shuck
2,645,504 A 7/1953 Branstrator et al.
2,669,613 A 2/1954 Despard
2,678,832 A 5/1954 Wright
2,682,671 A 7/1954 Faure
2,764,422 A 9/1956 McDonald
2,774,494 A 12/1956 Malmström
2,825,582 A 3/1958 McDonald
2,921,643 A 1/1960 Vanderveld
2,925,876 A 2/1960 Wagner
2,998,265 A 8/1961 Kozicki
3,008,533 A 11/1961 Haberle
3,012,633 A 12/1961 Magee
3,039,562 A 6/1962 Wagner
3,095,216 A 6/1963 Browne et al.
3,164,394 A 1/1965 Husko
3,172,499 A 3/1965 Stairs
3,266,594 A 8/1966 Antosh et al.
3,329,443 A 7/1967 Lowder et al.
3,392,990 A 7/1968 Wolf
3,488,066 A 1/1970 Hansen
3,494,634 A 2/1970 De Paula
3,515,406 A 6/1970 Endsley
3,517,942 A 6/1970 Cuffe et al.
3,522,396 A 7/1970 Norden
3,528,574 A 9/1970 Denner et al.
3,572,754 A 3/1971 Fowler
3,608,957 A 9/1971 Maneck
3,650,423 A 3/1972 O'Brien
3,671,058 A 6/1972 Kent
3,745,595 A 7/1973 Nagy
3,756,622 A 9/1973 Pyle et al.
3,762,742 A 10/1973 Bucklen
3,784,227 A 1/1974 Rogge
3,799,288 A 3/1974 Manuel
3,807,757 A 4/1974 Carpenter et al.
3,833,240 A 9/1974 Weiler
3,853,369 A 12/1974 Holden
3,863,890 A 2/1975 Ruffing
3,865,399 A 2/1975 Way
3,869,022 A 3/1975 Wallk
3,869,169 A 3/1975 Johnson et al.
3,887,217 A 6/1975 Thomas
3,889,997 A 6/1975 Schoneck
3,891,261 A 6/1975 Finneman
3,913,497 A 10/1975 Maroshick
3,915,475 A 10/1975 Casella et al.
3,957,284 A 5/1976 Wright
3,961,809 A 6/1976 Clugston
3,980,319 A 9/1976 Kirkpatrick
3,981,515 A 9/1976 Rosborough
3,986,724 A 10/1976 Rivinius
3,997,211 A 12/1976 Graves
4,020,920 A 5/1977 Abbott
4,053,172 A 10/1977 McClure
4,058,228 A 11/1977 Hall
4,068,542 A 1/1978 Brand et al.
4,073,502 A 2/1978 Frank et al.
4,089,538 A 5/1978 Eastridge
4,098,346 A 7/1978 Stanfill
4,106,790 A 8/1978 Weiler
4,110,673 A 8/1978 Nagy et al.
4,116,457 A 9/1978 Nerem et al.
4,124,099 A 11/1978 Dudynskyj
4,145,066 A 3/1979 Shearin
4,164,292 A 8/1979 Karkau
4,168,764 A 9/1979 Walters
4,174,021 A 11/1979 Barlock
4,180,143 A 12/1979 Clugston
4,185,849 A 1/1980 Jaeger
4,188,889 A 2/1980 Favrel
4,194,754 A 3/1980 Hightower
4,205,862 A 6/1980 Tarvin
4,219,104 A 8/1980 MacLeod
4,231,583 A 11/1980 Learn
4,275,664 A 6/1981 Reddy
4,325,668 A 4/1982 Julian et al.
4,369,984 A 1/1983 Hagen
4,424,751 A 1/1984 Blochlinger
4,440,364 A 4/1984 Cone et al.
4,462,484 A 7/1984 Dignan
4,536,004 A 8/1985 Brynielsson et al.
4,542,805 A 9/1985 Hamlin et al.
4,570,962 A 2/1986 Chavira
4,623,160 A 11/1986 Trudell
D287,001 S 12/1986 Jarvie et al.
4,676,013 A 6/1987 Endo
4,679,810 A 7/1987 Kimball
4,696,349 A 9/1987 Harwood et al.
D292,904 S 11/1987 Bielby
4,708,355 A 11/1987 Tiede
4,711,613 A 12/1987 Fretwell
4,720,116 A 1/1988 Williams et al.
4,733,752 A 3/1988 Sklar
4,757,876 A 7/1988 Peacock
4,846,487 A 7/1989 Criley
4,858,888 A 8/1989 Cruz et al.
4,909,700 A 3/1990 Fontecchio et al.
4,911,264 A 3/1990 McCafferty
4,926,965 A 5/1990 Fox
4,930,973 A 6/1990 Robinson
4,958,979 A 9/1990 Svensson
4,982,974 A 1/1991 Guidry
4,991,890 A 2/1991 Paulson
D316,394 S 4/1991 Carr
5,005,667 A 4/1991 Anderson
5,005,850 A 4/1991 Baughman
5,007,654 A 4/1991 Sauber
5,028,063 A 7/1991 Andrews
5,039,119 A 8/1991 Baughman
5,085,450 A 2/1992 DeHart, Sr.
5,137,294 A 8/1992 Martin
5,154,125 A 10/1992 Renner et al.
5,195,609 A 3/1993 Ham et al.
5,199,731 A 4/1993 Martin
5,228,707 A 7/1993 Yoder
5,228,761 A 7/1993 Huebschen et al.
5,238,300 A 8/1993 Slivon et al.
5,253,973 A 10/1993 Fretwell
D340,905 S 11/1993 Orth et al.
5,257,767 A 11/1993 McConnell
5,257,847 A 11/1993 Yonehara

(56) References Cited

U.S. PATENT DOCUMENTS 5,261,779 A 11/1993 Goodrich
5,280,934 A 1/1994 Monte
5,284,349 A 2/1994 Bruns et al.
5,286,049 A 2/1994 Khan
5,342,073 A 8/1994 Poole
5,358,268 A 10/1994 Hawkins
5,375,864 A 12/1994 McDaniel
5,423,463 A 6/1995 Weeks
5,425,615 A 6/1995 Hall et al.
5,439,342 A 8/1995 Hall et al.
5,462,302 A 10/1995 Leitner
5,478,124 A 12/1995 Warrington
5,498,012 A 3/1996 McDaniel et al.
5,501,475 A 3/1996 Bundy
5,505,476 A 4/1996 Maccabee
5,513,866 A 5/1996 Sisson
5,538,100 A 7/1996 Hedley
5,538,265 A 7/1996 Chen et al.
5,538,269 A 7/1996 McDaniel et al.
5,547,040 A 8/1996 Hanser et al.
5,549,312 A 8/1996 Garvert
5,584,493 A 12/1996 Demski et al.
5,601,300 A 2/1997 Fink et al.
5,624,127 A 4/1997 Arreola et al.
5,697,623 A 12/1997 Bermes et al.
5,697,626 A 12/1997 McDaniel et al.
5,727,840 A 3/1998 Ochiai et al.
5,779,208 A 7/1998 McGraw
5,842,709 A 12/1998 Maccabee
5,876,051 A 3/1999 Sage
5,897,125 A 4/1999 Bundy
5,937,468 A 8/1999 Wiedeck et al.
5,941,342 A 8/1999 Lee
5,957,237 A 9/1999 Tigner
5,980,449 A 11/1999 Benson et al.
5,988,970 A 11/1999 Holtom
6,012,545 A 1/2000 Faleide
6,027,090 A 2/2000 Liu
6,042,052 A 3/2000 Smith et al.
6,055,780 A 5/2000 Yamazaki
6,065,924 A 5/2000 Budd et al.
6,082,693 A 7/2000 Benson et al.
6,082,751 A 7/2000 Hanes et al.
6,112,152 A 8/2000 Tuttle
6,135,472 A 10/2000 Wilson et al.
6,149,172 A 11/2000 Pascoe et al.
6,158,756 A 12/2000 Hansen
6,168,176 B1 1/2001 Mueller
6,170,842 B1 1/2001 Mueller
6,179,312 B1 1/2001 Paschke et al.
6,179,546 B1 1/2001 Citrowske
6,203,040 B1 3/2001 Hutchins
6,213,486 B1 4/2001 Kunz et al.
6,224,317 B1 5/2001 Kann
6,264,222 B1 7/2001 Johnston et al.
6,270,099 B1 8/2001 Farkash
6,325,397 B1 12/2001 Pascoe
6,352,295 B1 3/2002 Leitner
6,357,992 B1 3/2002 Ringdahl et al.
6,375,207 B1 4/2002 Dean et al.
6,412,799 B1 7/2002 Schrempf
6,422,342 B1 7/2002 Armstrong et al.
6,425,572 B1 7/2002 Lehr
6,430,164 B1 8/2002 Jones et al.
6,435,534 B1 8/2002 Stone
6,439,342 B1 8/2002 Boykin
6,460,915 B1 10/2002 Bedi et al.
6,471,002 B1 10/2002 Weinerman
6,511,086 B2 1/2003 Schlicht
6,511,402 B2 1/2003 Shu
6,513,821 B1 2/2003 Heil
6,533,303 B1 3/2003 Watson
6,536,790 B1 3/2003 Ojanen
6,588,783 B2 7/2003 Fichter
6,612,596 B2 9/2003 Jeon et al.
6,641,158 B2 11/2003 Leitner
6,659,484 B2 12/2003 Knodle et al.
6,663,125 B1 12/2003 Cheng
6,746,033 B1 6/2004 McDaniel
6,769,704 B2 8/2004 Cipolla
6,810,995 B2 11/2004 Warford
6,812,466 B2 11/2004 O'Connor et al.
6,830,257 B2 12/2004 Leitner
6,834,875 B2 12/2004 Leitner
6,840,526 B2 1/2005 Anderson et al.
6,874,801 B2 4/2005 Fichter
6,880,843 B1 4/2005 Greer, Jr.
6,912,912 B2 7/2005 Reichinger et al.
6,918,624 B2 7/2005 Miller et al.
6,926,295 B2 8/2005 Berkebile et al.
6,938,909 B2 9/2005 Leitner
6,942,233 B2 9/2005 Leitner et al.
6,942,272 B2 9/2005 Livingston
6,948,903 B2 9/2005 Ablabutyan et al.
6,951,357 B2 10/2005 Armstrong et al.
6,955,370 B2 10/2005 Fabiano et al.
6,959,937 B2 11/2005 Schneider et al.
6,966,597 B2 11/2005 Tegtmeier
6,971,652 B2 12/2005 Bobbert et al.
6,997,469 B2 2/2006 Lanoue et al.
7,000,932 B2 2/2006 Heil et al.
7,007,961 B2 3/2006 Leitner
7,017,927 B2 3/2006 Henderson et al.
7,055,839 B2 6/2006 Leitner
7,090,276 B1 8/2006 Bruford et al.
7,111,859 B2 9/2006 Kim et al.
7,118,120 B2 10/2006 Lee et al.
7,163,221 B2 1/2007 Leitner
7,258,386 B2 8/2007 Leitner
7,287,771 B2 10/2007 Lee et al.
7,360,779 B2 4/2008 Crandall
7,367,574 B2 5/2008 Leitner
7,380,807 B2 6/2008 Leitner
7,398,985 B2 7/2008 Leitner et al.
7,413,204 B2 8/2008 Leitner
7,416,202 B2 8/2008 Fichter
7,487,986 B2 2/2009 Leither et al.
7,516,703 B2 4/2009 Tazreiter
7,566,064 B2 7/2009 Leitner et al.
7,584,975 B2 9/2009 Leitner
7,594,672 B2 9/2009 Piotrowski
7,621,546 B2 11/2009 Ross et al.
7,637,519 B2 12/2009 Leitner et al.
7,673,892 B2 3/2010 Kuntze et al.
7,717,444 B2 5/2010 Fichter
7,740,261 B2 6/2010 Leitner et al.
7,793,596 B2 9/2010 Hirtenlehner
7,823,896 B2 11/2010 VanBelle
7,874,565 B2 1/2011 Duncan
D634,687 S 3/2011 Vukel
7,900,944 B2 3/2011 Watson
7,909,344 B1 3/2011 Bundy
7,934,737 B2 5/2011 Okada
7,976,042 B2 7/2011 Watson et al.
8,038,164 B2 10/2011 Stahl et al.
8,042,821 B2 10/2011 Yang et al.
D649,100 S 11/2011 Cheng
8,052,162 B2 11/2011 Yang et al.
8,056,913 B2 11/2011 Kuntze et al.
8,070,173 B2 12/2011 Watson
8,136,826 B2 3/2012 Watson
8,146,935 B1 4/2012 Adams
8,157,277 B2 4/2012 Leitner et al.
8,177,247 B1 5/2012 Carr
8,205,901 B2 6/2012 Yang et al.
D665,713 S 8/2012 Pochurek et al.
8,262,113 B1 9/2012 Chafey et al.
8,297,635 B2 10/2012 Agoncillo et al.
D671,874 S 12/2012 Kekich et al.
8,342,550 B2 1/2013 Stickles et al.
8,342,551 B2 1/2013 Watson et al.
8,360,455 B2 1/2013 Leitner et al.
8,408,571 B2 4/2013 Leitner et al.
8,419,034 B2 4/2013 Leitner et al.

(56) References Cited

U.S. PATENT DOCUMENTS 8,469,380 B2 6/2013 Yang et al.
8,602,431 B1 12/2013 May
8,827,294 B1 9/2014 Leitner et al.
8,833,782 B2 9/2014 Huotari et al.
8,844,957 B2 9/2014 Leitner et al.
D720,674 S 1/2015 Stanesic et al.
8,936,266 B2 1/2015 Leitner et al.
8,944,451 B2 2/2015 Leitner et al.
9,156,406 B2 10/2015 Stanesic et al.
9,272,667 B2 3/2016 Smith
9,302,626 B2 4/2016 Leitner et al.
9,346,404 B1 5/2016 Bundy
9,346,405 B2 5/2016 Leitner et al.
9,511,717 B2 12/2016 Smith
9,522,634 B1 12/2016 Smith
9,527,449 B2 12/2016 Smith
9,550,458 B2 1/2017 Smith et al.
9,561,751 B2 2/2017 Leitner et al.
9,573,467 B2 2/2017 Chen et al.
9,656,609 B2 5/2017 Du et al.
9,669,766 B2 6/2017 Du et al.
9,669,767 B2 6/2017 Du et al.
9,688,205 B2 6/2017 Du et al.
9,701,249 B2 7/2017 Leitner et al.
9,764,691 B2 9/2017 Stickles et al.
9,809,172 B2 11/2017 Stanesic et al.
9,834,147 B2 12/2017 Smith
9,902,328 B1 2/2018 Mazur
9,944,231 B2 4/2018 Leitner et al.
9,975,742 B1 5/2018 Mason
10,010,467 B2 7/2018 Sato
10,049,505 B1 8/2018 Harvey
10,053,017 B2 8/2018 Leitner et al.
10,065,486 B2 9/2018 Smith et al.
10,077,016 B2 9/2018 Smith et al.
10,081,302 B1 9/2018 Frederick et al.
10,106,069 B2 10/2018 Rasekhi
10,106,086 B1 10/2018 Eckstein et al.
10,106,087 B2 10/2018 Stojkovic et al.
10,106,088 B2 10/2018 Smith
10,118,557 B2 11/2018 Pribisic
10,124,735 B2 11/2018 Du et al.
10,124,839 B2 11/2018 Povinelli et al.
10,140,618 B2 11/2018 Crawford
10,144,345 B2 12/2018 Stinson et al.
10,150,419 B2 12/2018 Derbis et al.
10,155,474 B2 12/2018 Salter et al.
10,173,595 B1 1/2019 Ulrich
10,183,623 B2 1/2019 Kirshnan et al.
10,183,624 B2 1/2019 Leitner et al.
10,189,517 B2 1/2019 Povinelli et al.
10,195,997 B2 2/2019 Smith
10,207,598 B2 2/2019 Reynolds et al.
10,214,963 B2 2/2019 Simula et al.
10,384,614 B1 8/2019 Du et al.
10,427,607 B2 10/2019 Otacioglu
10,539,285 B1 1/2020 Johnson
10,576,879 B1 3/2020 Salter
10,604,076 B2 * 3/2020 Lanini .................... B60R 3/002
10,618,472 B2 4/2020 Du
10,649,483 B2 5/2020 Liu et al.
10,682,960 B2 6/2020 Du
10,821,904 B2 11/2020 Du
10,885,759 B1 1/2021 Lee
11,021,108 B2 6/2021 Du
11,198,394 B2 12/2021 Du et al.
11,208,043 B2 12/2021 Du et al.
11,208,044 B2 12/2021 Smith et al.
11,292,390 B2 4/2022 Du et al.
11,318,889 B2 5/2022 Du et al.
11,414,017 B2 8/2022 Qing et al.
2002/0109446 A1 8/2002 Arnold
2002/0130531 A1 9/2002 Leitner
2002/0153201 A1 10/2002 Warford
2003/0011164 A1 1/2003 Cipolla
2003/0038446 A1 2/2003 Anderson et al.
2003/0090081 A1 5/2003 Oakley
2003/0094781 A1 5/2003 Jaramillo et al.
2003/0132595 A1 7/2003 Fabiano et al.
2003/0200700 A1 10/2003 Leitner
2004/0100063 A1 5/2004 Henderson et al.
2004/0108678 A1 6/2004 Berkebile et al.
2004/0135339 A1 7/2004 Kim
2005/0035568 A1 2/2005 Lee et al.
2005/0146157 A1 7/2005 Leitner
2005/0231149 A1 10/2005 Numauchi
2005/0275187 A1 12/2005 Chaudoin et al.
2005/0280242 A1 12/2005 Fabiano et al.
2006/0082096 A1 4/2006 Sukonthapanich et al.
2006/0125204 A1 6/2006 Leitner et al.
2006/0214386 A1 9/2006 Watson
2006/0219484 A1 10/2006 Ogura
2006/0284440 A1 12/2006 Leitner
2008/0042396 A1 2/2008 Watson
2008/0100023 A1 5/2008 Ross
2008/0100025 A1 5/2008 Leitner et al.
2008/0116653 A1 5/2008 Piotrowski
2008/0271936 A1 11/2008 Kuntze et al.
2009/0250896 A1 10/2009 Watson
2009/0295114 A1 12/2009 Yang et al.
2009/0295115 A1 12/2009 Yang et al.
2010/0044993 A1 2/2010 Watson
2011/0115187 A1 5/2011 Leitner et al.
2011/0246021 A1 10/2011 Prokhorov
2012/0025485 A1 2/2012 Yang et al.
2012/0046846 A1 2/2012 Dollens
2013/0154230 A1 6/2013 Ziaylek
2015/0094898 A1 4/2015 Tellis
2015/0097353 A1 4/2015 Rasmussen et al.
2015/0137482 A1 5/2015 Woolf
2015/0197199 A1 7/2015 Kuo
2015/0321612 A1 11/2015 Leitner et al.
2015/0321613 A1 11/2015 Leitner et al.
2016/0039346 A1 2/2016 Yang et al.
2016/0193964 A1 7/2016 Stanesic et al.
2016/0280190 A1 9/2016 Franz
2017/0008459 A1 1/2017 Leitner et al.
2017/0021781 A1 1/2017 Du
2017/0036605 A1 2/2017 Du
2017/0036606 A1 2/2017 Du
2017/0036607 A1 2/2017 Du et al.
2017/0144606 A1 5/2017 Smith
2017/0190308 A1 7/2017 Smith
2017/0246993 A1 8/2017 Smith
2017/0267182 A1 9/2017 Leitner
2017/0355315 A1 12/2017 Leitner
2018/0095457 A1 4/2018 Lee
2018/0141497 A1 5/2018 Smith
2018/0201194 A1 7/2018 Stanesic
2018/0257572 A1 9/2018 Du et al.
2018/0281687 A1 10/2018 Derbis et al.
2018/0293811 A1 10/2018 Liu
2018/0326911 A1 11/2018 Leitner
2019/0009725 A1 1/2019 Stojkovic et al.
2019/0047477 A1 2/2019 Crandall
2019/0054961 A1 2/2019 Ngo
2019/0071021 A1 3/2019 Pribisic
2019/0071042 A1 3/2019 Smith
2019/0084482 A1 3/2019 Long et al.
2019/0084628 A1 3/2019 Povinelli et al.
2019/0294196 A1 9/2019 Liu et al.
2020/0023779 A1 1/2020 Du et al.
2020/0023780 A1 1/2020 Du et al.
2020/0047674 A1 2/2020 Du et al.
2020/0180512 A1 6/2020 Godfrey
2020/0262354 A1 8/2020 Du et al.
2020/0265658 A1 8/2020 Du et al.
2020/0269763 A1 8/2020 Du et al.
2020/0282814 A1 9/2020 Alban et al.
2020/0282913 A1 9/2020 Qing
2020/0282914 A1 9/2020 Du et al.
2020/0290424 A1 9/2020 Zhan
2020/0331396 A1 10/2020 Du et al.
2020/0369209 A1 11/2020 Pantea et al.

(56) References Cited

U.S. PATENT DOCUMENTS

2021/0078591 A1 3/2021 Du et al.
2021/0213885 A1 7/2021 Du et al.
2021/0221449 A1 7/2021 Milani et al.
2021/0347303 A1 11/2021 Qing et al.
2021/0347304 A1 11/2021 Qing et al.
2022/0097609 A1 3/2022 Watson
2022/0194299 A1 6/2022 Du et al.
2022/0219612 A1 7/2022 Du et al.
2022/0371517 A1 11/2022 Du et al.
2023/0021767 A1* 1/2023 Watson .................. B60R 3/002
2023/0202396 A1 6/2023 Du et al.

FOREIGN PATENT DOCUMENTS

CA 2218280 A1 6/1999
CA 2332193 A1 9/2001
CA 2370618 A1 11/2007
CN 2174368 Y 8/1994
CN 2806241 Y 8/2006
CN 2815779 Y 9/2006
CN 1976833 A 6/2007
CN 101279594 A 10/2008
CN 201842021 U 5/2011
CN 102394918 A 3/2012
CN 202806579 U 3/2013
CN 103507719 A 1/2014
CN 203728468 U 7/2014
CN 104192070 A 12/2014
CN 204264034 U 4/2015
CN 204474223 U 7/2015
CN 204567461 U 8/2015
CN 204586746 U 8/2015
CN 105034963 A 11/2015
CN 105083136 A 11/2015
CN 105083137 A 11/2015
CN 105128751 A 12/2015
CN 105450762 A 3/2016
CN 106249641 A 12/2016
CN 106499293 A 3/2017
CN 107601333 A 1/2018
CN 108263303 A 7/2018
CN 207617613 U 7/2018
CN 108357434 A 8/2018
CN 108454518 A 8/2018
CN 207758678 U 8/2018
CN 108583446 A 9/2018
CN 108632335 A 10/2018
CN 108791086 A 11/2018
CN 108973868 A 12/2018
CN 208198270 A 12/2018
CN 208232903 U 12/2018
CN 109253888 A 1/2019
CN 208325054 U 1/2019
CN 208344082 U 1/2019
CN 208498387 A 2/2019
CN 110733427 A 1/2020
CN 110758256 A 2/2020
CN 210284089 U 4/2020
CN 211223233 A 8/2020
CN 111891032 A 11/2020
CN 213948287 U 8/2021
CN 214542763 U 10/2021
CN 214633678 U 11/2021
CN 215097303 U 12/2021
CN 215915494 U 3/2022
CN 216767045 U 6/2022
CN 216833445 U 6/2022
CN 116061813 A 5/2023
CN 219467639 U 8/2023
DE 1042403 B 10/1958
DE 1220276 B 6/1966
DE 2555468 A1 6/1977
DE 7922488 U1 7/1982
DE 3151621 A1 7/1983
DE 3932142 4/1990
DE 8910933 U1 10/1990
EP 0066493 12/1982
EP 373842 A1 6/1990
EP 0418615 A1 3/1991
EP 0559624 B1 8/1995
EP 0901783 A2 3/1999
EP 0966367 A1 12/1999
EP 1116840 A2 7/2001
EP 1213185 B1 12/2004
EP 3002157 4/2016
EP 3266670 A1 1/2018
EP 3176038 B1 1/2019
EP 3237254 B1 2/2019
FR 1271901 A 9/1961
FR 1350593 A 1/1964
FR 2225612 A 8/1974
FR 2651739 A1 3/1991
FR 2764254 A1 12/1998
GB 191315077 8/1913
GB 254426 7/1926
GB 340162 A 12/1930
GB 381672 10/1932
GB 745918 3/1956
GB 934387 8/1963
GB 936846 9/1963
GB 987846 A 3/1965
GB 1430813 A 4/1976
GB 1471256 A 4/1977
GB 2045699 A 11/1980
GB 2055705 A 3/1981
GB 2129378 5/1984
GB 2201511 A 9/1988
GB 2288014 A 10/1995
IN 201741011829 10/2018
JP 63-255144 A 10/1988
JP H04138944 A 5/1992
JP H04339040 A 11/1992
JP H04342629 A 11/1992
JP H05310061 A 11/1993
JP H05310081 A 11/1993
JP 8-132967 A 5/1996
JP H08132967 A 5/1996
JP H10287182 A 10/1998
JP 2008105567 A 5/2008
JP 2018-177089 A 11/2018
JP 2019-001222 A 1/2019
KR 19980010764 U 5/1998
KR 2000-0003099 A 1/2000
KR 101719102 B1 3/2017
MX 2017001699 A 8/2018
MX 2017001700 A 8/2018
MX 2017006328 A 8/2018
MX 2017008032 A 9/2018
MX 2017010183 A 9/2018
SU 403594 11/1973
SU 783097 A1 11/1980
WO 1988/05759 A1 8/1988
WO 1995/00359 A1 1/1995
WO 1997/027139 A1 7/1997
WO 1998/43856 A2 10/1998
WO 2000/047449 A1 8/2000
WO 2001/000441 A1 1/2001
WO 2003/039910 A1 5/2003
WO 2003/039920 A1 5/2003
WO 2003/066380 A1 8/2003
WO 2003/069294 A1 8/2003
WO 2006/050297 A2 5/2006
WO 2009/103163 A1 8/2009
WO 2017/176226 A1 10/2017
WO 2018/148643 A1 8/2018
WO 2018/197393 A1 11/2018
WO 2019/009131 A1 1/2019
WO 2019/034493 A1 2/2019

OTHER PUBLICATIONS

U.S. Office Action mailed Nov. 18, 2019 for U.S. Appl. No. 16/510,775, filed Jul. 12, 2019. (9 pages).

(56) References Cited

OTHER PUBLICATIONS

U.S. Office Action mailed Dec. 20, 2019 for U.S. Appl. No. 16/655,149, filed Oct. 16, 2019. (11 pages).
International Search Report and Written Opinion of the International Searching Authority for PCT International Application NoInternational application No. PCT/CN2019/075535 mailed Nov. 11, 2019. (English translation, p. 1- 21).
International Search Report and Written Opinion of the International Searching Authority for PCT International Application No. PCT/CN2019/082919 mailed Oct. 11, 2019. (English Translation, p. 1-20).
U.S. Office Action Mailed Jun. 9, 2020 for U.S. Appl. No. 16/826,094, filed Mar. 20, 2020 (10 pages).
U.S. Office Action Mailed Jun. 9, 2020 for U.S. Appl. No. 15/931,474, filed May 13, 2020 (12 pages).
U.S. Notice of Allowance for U.S. Appl. No. 16/510,775 Mailed Feb. 3, 2020.
U.S. Notice of Allowance for U.S. Appl. No. 16/655,149 Mailed Feb. 20, 2020.
U.S. Notice of Allowance for U.S. Appl. No. 16/826,083 mailed Oct. 9, 2020.
Australian Application No. 2019250149 Office Action Mailed Oct. 6, 2020, pp. 1-4).
Final Office Action Mailed Oct. 27, 2020 for U.S. Appl. No. 15/931,474, filed Oct. 27, 2020 (13 pages).
Final Office Action Mailed Feb. 16, 2021 for U.S. Appl. No. 16/826,094, filed Mar. 20, 2020 (15 pages).
Non-Final Office Action Mailed Jun. 10, 2021 for U.S. Appl. No. 16/517,527, filed Jul. 19, 2019 (6 pages).
Chinese Application No. 201910125764.6 Office Action Mailed May 6, 2021, pp. 1-13.
U.S. Appl. No. 16/810,637 Office Action Mailed Oct. 14, 2021, pp. 1-9.
U.S. Appl. No. 16/517,527 Notice of Allowance Mailed Sep. 17, 2021, pp. 1-7.
U.S. Appl. No. 15/931,474, Notice of Allowance Mailed Nov. 17, 2021, pp. 1-5.
U.S. Appl. No. 17/218,054, Non-Final Office Action Mailed Dec. 9, 2021, 49 pages.
U.S. Appl. No. 17/218,054, Notice of Allowance Mailed Mar. 23, 2022, pp. 1-5.
U.S. Notice of Allowance for U.S. Appl. No. 16/826,083 mailed Jan. 21, 2022.
U.S. Notice of Allowance for U.S. Appl. No. 16/826,083 mailed Dec. 30, 2020.
U.S. Notice of Allowance for U.S. Appl. No. 17/658,991 mailed Oct. 25, 2022.
International Search Report and Written Opinion of the International Searching Authority for Application No. PCT/CN2019/077842 mailed Oct. 12, 2019, 13 pages with English translation.
Non-Final Office Action Mailed Apr. 29, 2022 for U.S. Appl. No. 16/854,876, filed Apr. 21, 2020 (10 pages).
U.S. Notice of Allowance for U.S. Appl. No. 16/854,876 mailed Aug. 1, 2022.
Non-Final Office Action Mailed Jun. 16, 2022 for U.S. Appl. No. 16/913,703, filed Jun. 26, 2020 (20 pages).
U.S. Notice of Allowance for U.S. Appl. No. 17/317,426 mailed Oct. 12, 2022.
Non-Final Office Action Mailed Nov. 26, 2018 for U.S. Appl. No. 15/200,940 (8 pages).
Final Office Action Mailed May 3, 2019 for U.S. Appl. No. 15/200,940, filed Jul. 1, 2016 (11 pages).
U.S. Notice of Allowance for U.S. Appl. No. 15/200,940 mailed Jul. 19, 2019.
Non-Final Office Action Mailed Apr. 13, 2022 for U.S. Appl. No. 16/682,960, filed Nov. 13, 2019 (41 pages).
Final Office Action Mailed Sep. 3, 2021 for U.S. Appl. No. 15/931,474, filed May 13, 2020 (5 pages).
U.S. Notice of Allowance for U.S. Appl. No. 16/810,637 mailed Apr. 27, 2022.
Non-Final Office Action Mailed Oct. 25, 2022 for U.S. Appl. No. 17/544,878, filed Dec. 7, 2021 (51 pages).
Final Office Action Mailed Oct. 4, 2022 for U.S. Appl. No. 16/682,960, filed Nov. 13, 2019 (34 pages).
Non-Final Office Action Mailed Oct. 6, 2022 for U.S. Appl. No. 17/317,611, filed May 7, 2021 (49 pages).
U.S. Notice of Allowance for U.S. Appl. No. 16/913,703 mailed Oct. 26, 2022.
U.S. Notice of Allowance for U.S. Appl. No. 16/913,703 mailed Dec. 7, 2022 (5 pages).
U.S. Appl. No. 17/317,611, Notice of Allowance mailed Jan. 25, 2023.
U.S. Appl. No. 18/168,546, Non-Final Office Action Mailed Jul. 6, 2023, pp. 1-8.
U.S. Appl. No. 18/168,546, Notice of Allowance Mailed Jan. 4, 2024, pp. 1-5.
U.S. Appl. No. 17/555,325, Non-Final Office Action mailed Dec. 13, 2023, pp. 1-16.
Chinese Application No. 201910304218.9, Office Action mailed Dec. 7, 2023, with English translation pp. 1-27.
International Search Report and Written Opinion of the International Searching Authority for PCT International Application No. PCT/CN2023/134230 mailed on Jun. 14, 2024.
International Search Report and Written Opinion of the Interenational Searching Authority for PCT International Application No. PCT/CN2023/104899, mailed on Oct. 20, 2023, 18 pages with English translation.
Cnipa, First Office Action for Chinese Application No. 202211572179.9, mailed on Aug. 16, 2025, 14 pages with unofficial English translation.
Non-Final Office Action for U.S. Appl. No. 18/883,975, mailed on Jun. 9, 2025, 12 pages.
Non-Final Office Action for U.S. Appl. No. 18/883,975, mailed on Nov. 26, 2025, 8 pages.

* cited by examiner

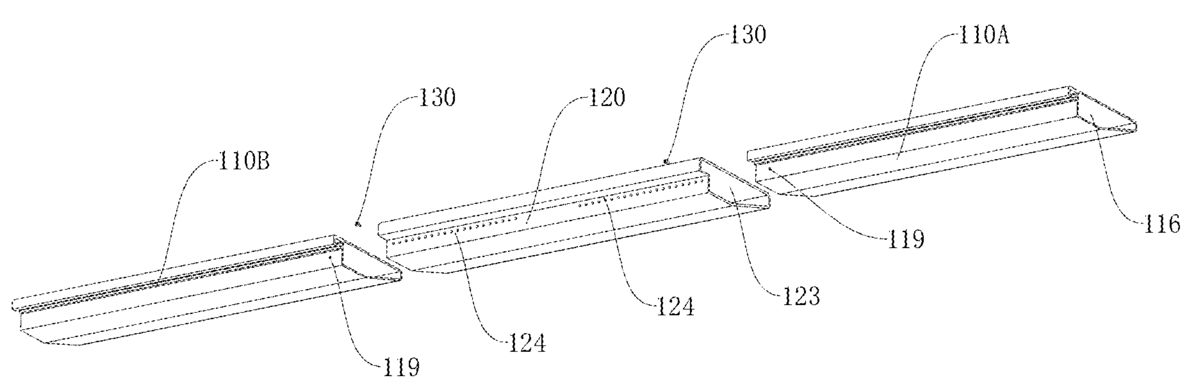
FIG. 27
FIG. 28
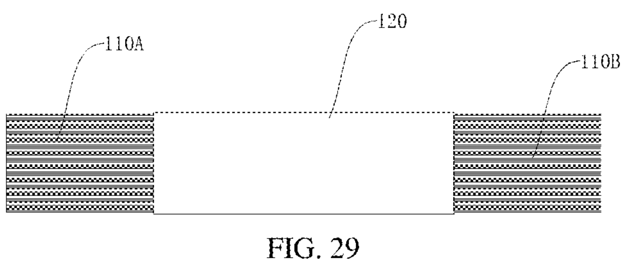
FIG. 29
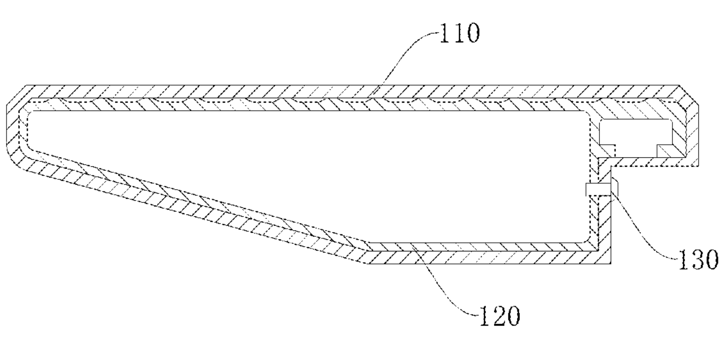
FIG. 30

STEP, STEP DEVICE AND VEHICLE

PRIORITY AND CROSS-REFERENCE TO RELATED APPLICATIONS

This patent document claims the benefits and priority of two prior Chinese patent applications No. 202311351803.7 and 202322797446.9 which were filed on Oct. 18, 2023, the entire contents of which are incorporated herein by reference.

TECHNICAL FIELD

The present disclosure relates to steps for persons to step on, including steps or step devices used for vehicles.

BACKGROUND

Step structures or devices can be used for persons to step on in facilitating people to get on or off a structure such as a vehicle. Vehicles such as off-road vehicles, buses, pickup trucks, or the like, have a large ground clearance between the chassis and the ground, and thus a step is usually installed on a vehicle body to facilitate people stepping thereon to get on or off the vehicle. The step installed on a side of the vehicle body is usually called a side step, and the step installed at a rear of the vehicle is usually called a rear step. Some traditional designs of a step may be an integral piece made of plastics or metal plates, which may be large in length, inconvenient to handle and transport, and not well suited for various applications.

SUMMARY

Embodiments of a first aspect of the present disclosure provide a step. The step includes a plurality of step segments, at least one connection step segment and a fastener. Adjacent step segments include a first step segment and a second step segment, the connection step segment has a first end and a second end in a length direction of the connection step segment, the first end of the connection step segment is slidably and detachably connected to the first step segment, the second end of the connection step segment is slidably and detachably connected to the second step segment, and the fastener is configured to fasten the connection step segment and the first step segment and to fasten the connection step segment and the second step segment.

Embodiments of a second aspect of the present disclosure provide a step device. The step device includes a linkage mechanism and a step. The step includes a plurality of step segments, at least one connection step segment and a fastener. Adjacent step segments include a first step segment and a second step segment, the connection step segment has a first end and a second end in a length direction of the connection step segment, the first end of the connection step segment is slidably and detachably connected to the first step segment, the second end of the connection step segment is slidably and detachably connected to the second step segment, and the fastener is configured to fasten the connection step segment and the first step segment and to fasten the connection step segment and the second step segment. The step is connected to the linkage mechanism to move between an extended position and a retracted position driven by the linkage mechanism.

Embodiments of a third aspect of the present disclosure provide a vehicle. The vehicle includes a vehicle body and a step device. The step device includes: a linkage mechanism and a step. The step includes a plurality of step segments, at least one connection step segment and a fastener. Adjacent step segments include a first step segment and a second step segment, the connection step segment has a first end and a second end in a length direction of the connection step segment, the first end of the connection step segment is slidably and detachably connected to the first step segment, the second end of the connection step segment is slidably and detachably connected to the second step segment, and the fastener is configured to fasten the connection step segment and the first step segment and to fasten the connection step segment and the second step segment. The step is connected to the linkage mechanism to move between an extended position and a retracted position driven by the linkage mechanism. The step device is mounted on at least one side of the vehicle body and/or a rear of the vehicle body.

BRIEF DESCRIPTION OF THE DRAWINGS

FIG. 27 is a perspective view of a step according to another embodiment of the present disclosure.

FIG. 28 is a top view of the step in an assembled state as shown in FIG. 27.

FIG. 29 is another top view of the step in the assembled state shown in FIG. 27, in which a length of the step is shortened.

FIG. 30 is a cross-sectional view of the step shown in FIG. 29.

DETAILED DESCRIPTION

Figure 1:
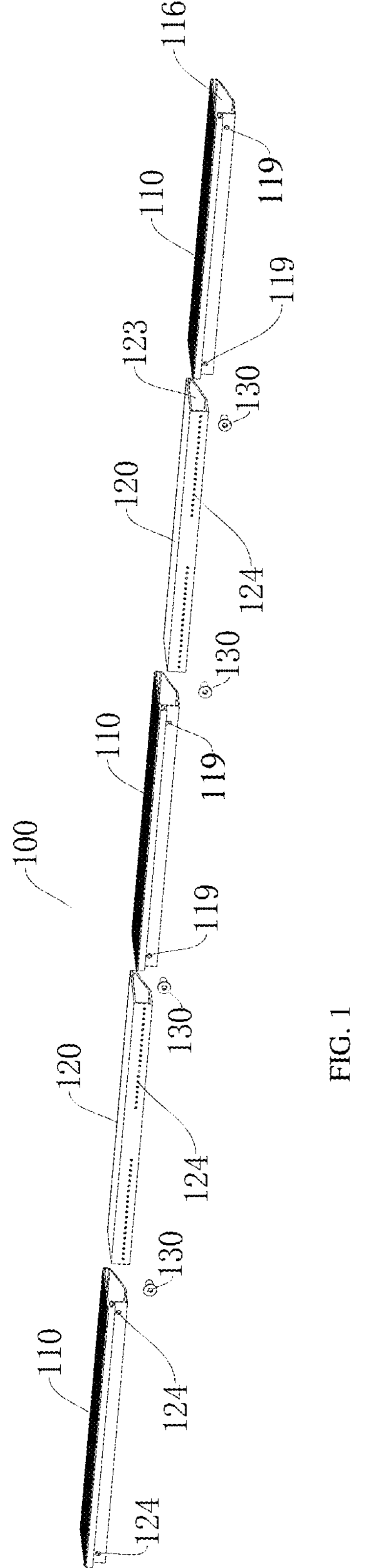
FIG. 1 is a perspective view of a step according to an embodiment of the present disclosure.

Embodiments of the present disclosure are described in detail below, implementation examples of which are shown in the accompanying drawing. The following embodiments described with reference to the accompanying drawing are illustrative. It should be understood that the embodiments and implementation examples described are intended to explain the present disclosure, but not to limit the present disclosure.

For convenience of description, in the description of the embodiments of the present disclosure, a front-rear direction refers to a front-rear direction of a vehicle after a step is installed on a vehicle body. After the step is installed on the vehicle body, a direction toward the inside of the vehicle body is inner, and a direction toward the outside of the vehicle body is outer.

In order to solve the problem of inconvenient handling and transportation of steps, a step is proposed in the related art, which is divided into two step bodies detachably or pivotally connected with each other. During handling and transportation, the two step bodies are detached from each other or overlaid by pivoting, and the two step bodies are assembled together or are aligned flush with each other by pivoting. However, steps of different vehicles may be of different lengths, and accordingly, different molds are needed to produce step bodies of different lengths, resulting in a large number of such different molds, high production costs, and poor applicability and adaptability for various applications.

A retractable step is also proposed in the related art, which is divided into two step bodies, the end of one of the two step bodies has a receiving hole, and the end of the other one of the two step bodies is slidably arranged in the receiving hole. During handling and transportation, one step body is retracted into the other step body, and when in use, one step body is pulled out of the other step body. However, the related art only addresses the problem of inconvenient handling and transportation of the step, and does not address the problem of limited applicability of the step, thus failing to teach the adjustment of the length of the step.

A length adjustable step is also proposed in the related art, in which one step body has a sliding groove and the other step body is slidably inserted in the sliding groove, thereby changing the length of the step by sliding one step body relative to the other step body.

However, the two step bodies of the retractable step and the length adjustable step are different in structure. For example, the thicknesses of the two step bodies of the retractable step are different, one step body includes the receiving hole and the end of the other step body is inserted into the receiving hole. For example, as for the two step bodies of the length adjustable step, one step body includes the sliding groove, and the other step body is slidably fitted in the sliding groove. Therefore, the two step bodies need to be produced separately by different molds, so that the two step bodies are poorly exchangeable, and there are problems such as a large number of such different molds needed, high costs and poor applicability and adaptability for various applications.

Referring to FIGS. 1-30, a step 100 of embodiments of the present disclosure is described. As shown in FIGS. 1-30, the step 100 of the embodiments of the present disclosure includes a plurality of step segments 110, at least one connection step segment 120 and a fastener 130. Adjacent step segments 110 includes a first step segment 110A and a second step segment 110B. The connection step segment 120 has a first end 121 and a second end 122 opposite to each other in its length direction (a front-rear direction in FIG. 2). The first end 121 of the connection step segment 120 is slidably and detachably connected to the first step segment 110A, and the second end 122 of the connection step segment 120 is slidably and detachably connected to the second step segment 110B.

The expression "slidably and detachably connected" refers to that the connection step segment 120 and the first step segment 110A may slide relative to each other to increase or decrease a length of an overlapping part between the connection step segment 120 and the first step segment 110A, and the connection step segment 120 may be detached from the first step segment 110A so that the first step segment 110A and the connection step segment 120 are separated. Similarly, the connection step segment 120 and the second step segment 110B may slide relative to each other to increase or decrease a length of an overlapping part between the connection step segment 120 and the second step segment 110B, and the connection step segment 120 may be detached from the second step segment 110B, so that the second step segment 110B and the connection step segment 120 are separated. Since the first step segment 110A and the second step segment 110B may slide relative to the connection step segment 120, an overall length of the step 100 may be adjusted by sliding the first step segment 110A and the second step segment 110B and hence adjusting relative positions of the first step segment 110A and the connection step segment 120 and of the second step segment 110B and the connection step segment 120. In other words, the step 100 of the embodiments of the present disclosure may be disassembled and has an adjustable length.

The fastener 130 is configured to fasten the connection step segment 120 and the first step segment 110A so that the relative position of the connection step segment 120 and the first step segment 110A is fixed, and to fasten the connection step segment 120 and the second step segment 110B so that the relative position of the connection step segment 120 and the second step segment 110B is fixed.

Figure 13:
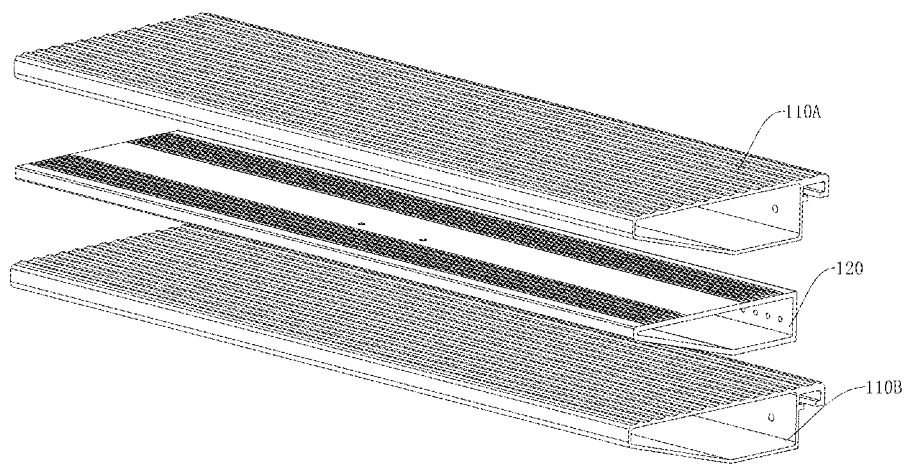
FIG. 13 is a schematic view of a first step segment, a second step segment and a connection step segment of a step after being disassembled according to an embodiment of the present disclosure.
Figure 14:
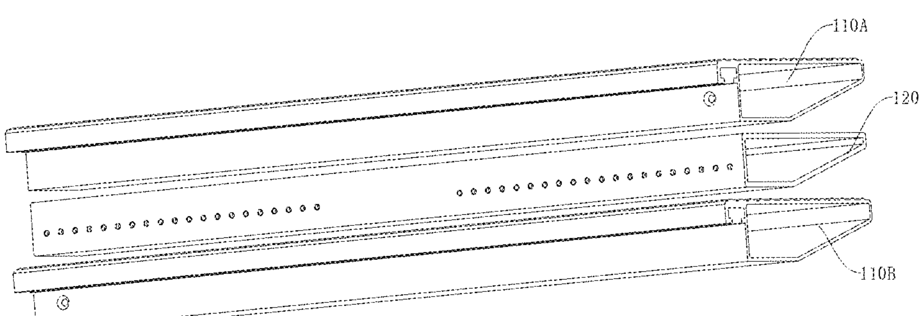
FIG. 14 is another schematic view of a first step segment, a second step segment and a connection step segment of a step after being disassembled according to an embodiment of the present disclosure.
Figure 15:
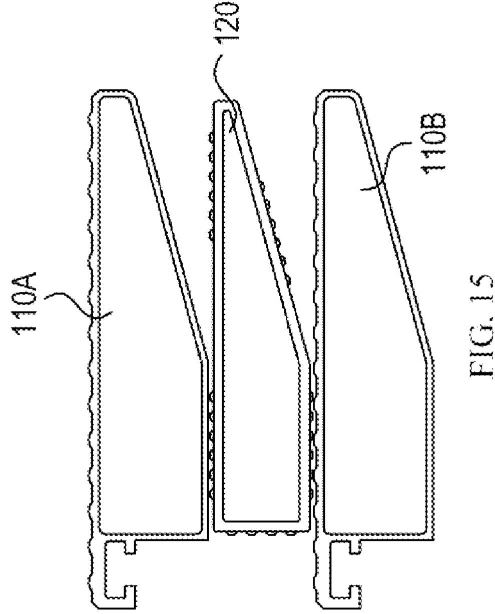
FIG. 15 is an end view of a first step segment, a second step segment and a connection step segment of a step after being disassembled and superimposed together according to an embodiment of the present disclosure.
Figure 16:
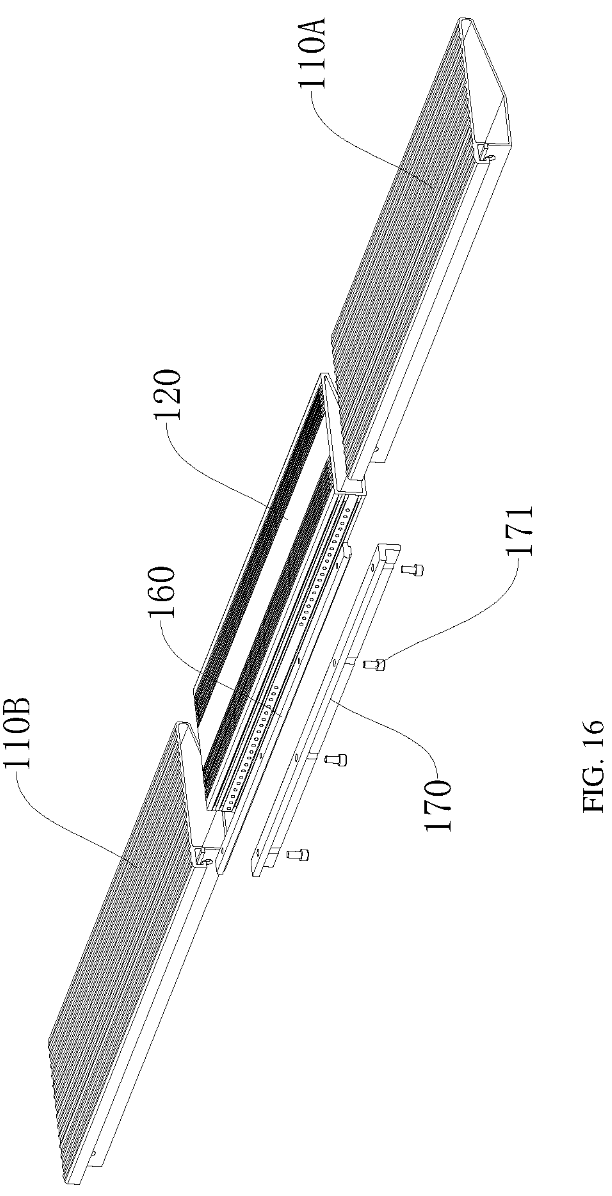
FIG. 16 is a perspective view of a step according to another embodiment of the present disclosure.
Figure 17:
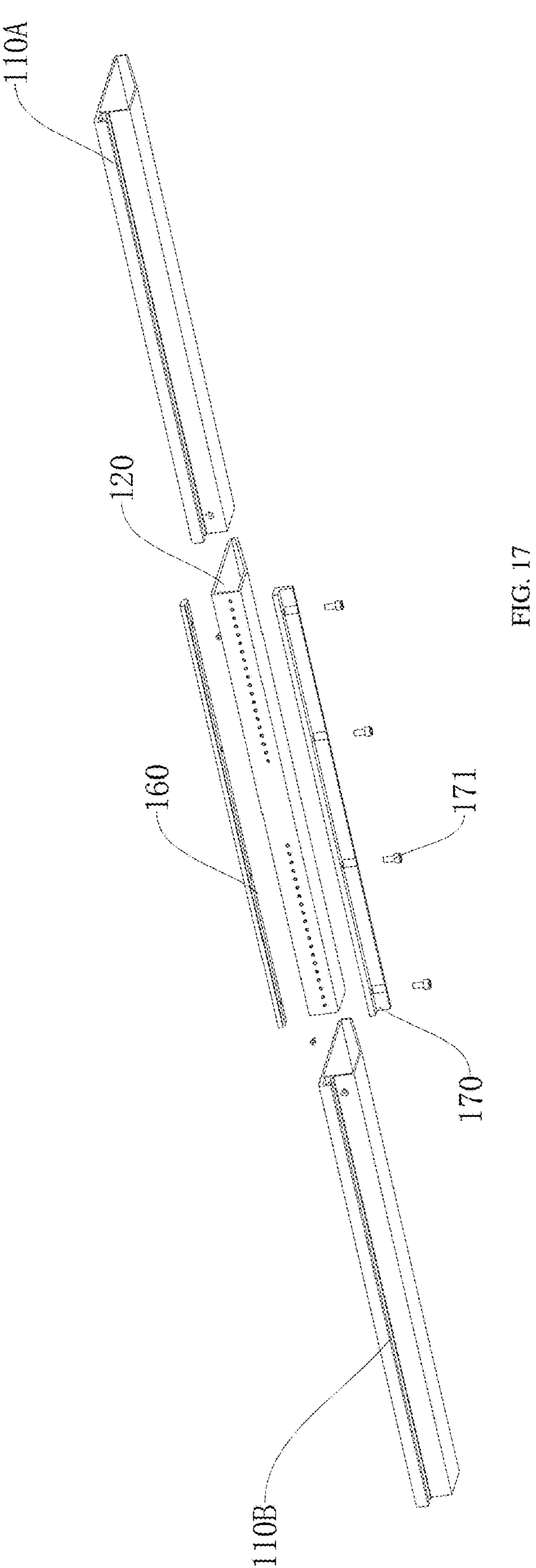
FIG. 17 is another perspective view of the step shown in FIG. 16.

To facilitate handling and transportation of the step 100, the fastener 130 is removed, the step segment 110 and the connection step segment 120 are detached, and the step segment 110 and the connection step segment 120 may be stacked, as shown in FIG. 13-FIG. 15. Compared with the assembled step segment 100, the stacked step segment 110 and connection step segment 120 have greatly reduced length, occupy less space, and improve the convenience of handling and transportation.

Figure 5:
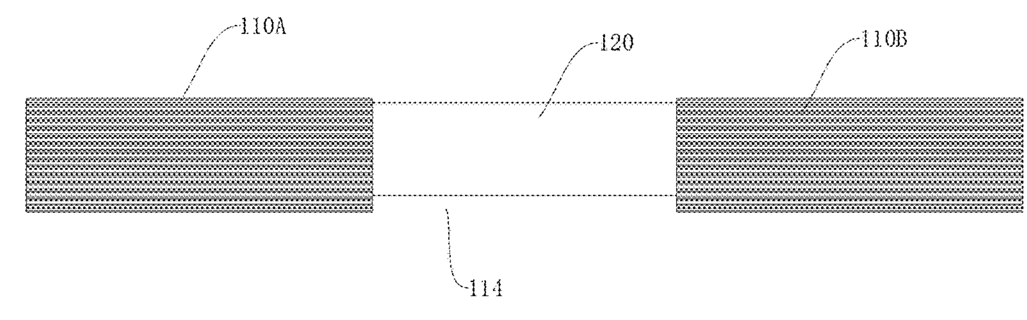
FIG. 5 is a top view of the step in an assembled state as shown in FIG. 3.
Figure 6:
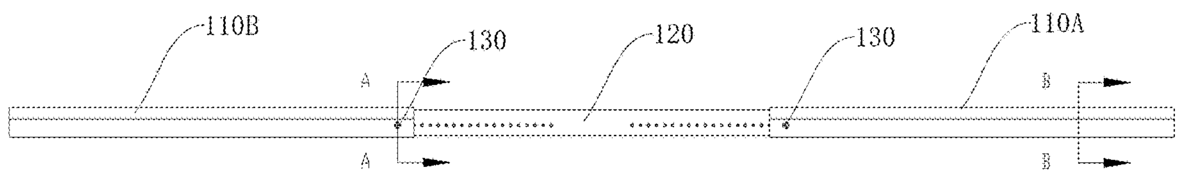
FIG. 6 is a side view of the step shown in FIG. 5.
Figure 7:
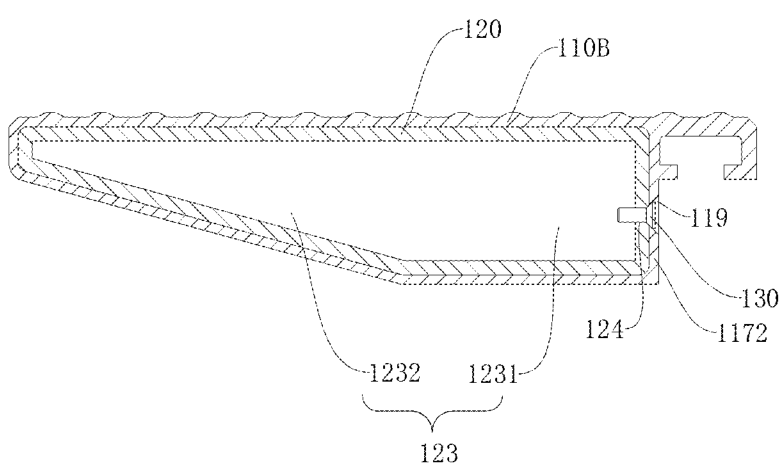
FIG. 7 is a cross-sectional view along line A-A in FIG. 6.

When the step 100 is installed on the vehicle for use after being assembled, as shown in FIGS. 1-4, the step segments 110 and the connection step segment 120 are connected sequentially along a length direction of the step (a front-rear direction in FIG. 2), and a step segment 110 and the connection step segment 120 are slid relative to each other to obtain the step 100 of a desired length. Then, the adjacent step segments 110 and connection step segment 120 are fastened by the fastener 130, as shown in FIGS. 5-7. Advantageously, the overlapping part of a step segment 110 and the connection step segment 120 may have a same length. When the length of the step 100 needs to be adjusted, the fastener 130 is removed, a step segment 110) and the connection step segment 120 are slid relative to each other, and then the step segment 110 and the connection step segment 120 are fastened by the fastener 130.

According to the step of the embodiments of the present disclosure, the connection step segment and the step segment are connected slidably and detachably. During handling and transportation, the connection step segment and the step segment are detached and separated to reduce the length of the step, reduce the volume occupied, improve the convenience of handling and transportation, and overcome the problem of inconvenient handling and transportation caused by an excessive length of the step. Moreover, the overall length of the step may be adjusted and changed by sliding the step segment and the connection step segment relative to each other, so as to be adapted to the needs of the steps of different lengths and provide a wide range of applications.

Moreover, according to the step of the embodiments of the present disclosure, adjacent two step segments are connected by a connection step segment. Compared with two step bodies directly connected in the related art, the step of the embodiments of the present disclosure may be assembled with the step segments of the same specifications, that is, the step segments may have the same structure, so that the step segments may be produced using molds of the same specifications, thus decreasing the number of different molds needed and reducing manufacturing costs. In addition, when there are a plurality of connection step segments, the connection step segments may have the same specifications, so that the connection step segments may be produced by molds of the same specifications, thus reducing the molds needed to produce the connection step segments, and further reducing the costs. Moreover, because of the same specifications, the step segments may be exchangeable with each other, and the connection step segments may be exchangeable with each other, thus facilitating assembling and repair. In addition, the length of the step may be adjusted not only by sliding the step segment and the connection step segment relative to each other, but also by adjusting the numbers of the step segments and the connection step segments, so as to obtain the steps of different lengths, thus further broadening the applicability of the steps.

In some embodiments, the fastener 130 may be a threaded member, such as a screw or a bolt, the step segment 110 has a fastening hole 119, the connection step segment 120 has a connecting fastening hole 124, and both the fastening hole 119 and the connecting fastening hole 124 may be threaded holes, or one is a threaded hole and the other is a through hole. The fastener 130 is fitted in the fastening hole 119 and the connecting fastening hole 124 to fasten the step segment 110 and the connection step segment 120, thus preventing the step segment 110 and the connection step segment 120 from sliding relative to each other when in use. When it is desirable to adjust the relative position between the step segment 110 and the connection step segment 120, or when it is desirable to detach and separate the step segment 110 from the connection step segment 120, the threaded member may be unscrewed from the fastening hole 119 and the connecting fastening hole 124.

Figure 1A:
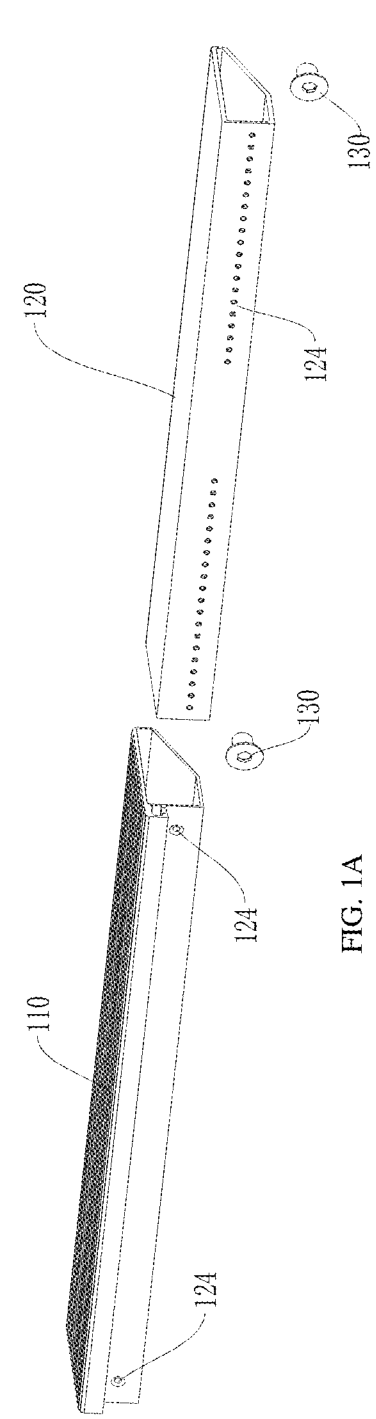
FIG. 1A is a partial enlarged view of the step shown in FIG. 1.

In some embodiments, as shown in FIG. 1 and FIG. 1A, the step segment 110 has a plurality of fastening holes 119 arranged at intervals in its extension direction (length direction), the connecting fastening hole 124 in the connection step segment 120 may be selectively aligned with the fastening holes 119, and the threaded member (i.e. the fastener 130) passes through the aligned connecting fastening hole 124 and fastening hole 119, so that the step segment 110 and the connection step segment 120 are connected and fastened. By changing the connecting fastening hole 124 and the fastening hole 119 aligned with each other, the step segment 110 and the connection step segment 120 may have different relative positions, and the step 100 may have different lengths.

In the embodiment shown in FIG. 1, the step segment 110 has two fastening holes 119, and the two fastening holes 119 are respectively adjacent to both ends of the step segment 110. The connection step segment 120 has two or more connecting fastening holes 124, such as forty connecting fastening holes 124. The forty connecting fastening holes 124 may be divided into two groups, each group includes twenty connecting fastening holes 124 arranged in a row; and the two groups of connecting fastening holes 124 are separated by a predetermined distance and may be symmetrical with each other. The present disclosure is not limited to this. In some embodiments, the step segment 110 may have three or more fastening holes 119.

In some embodiments, the connection step segment 120 may have two connecting fastening holes 124 spaced apart by an interval in its length direction, and the step segment 110 may have two or more fastening holes 119 arranged at intervals along its length direction. The fastening holes 119 may be selectively aligned with the connecting fastening holes 124, and the threaded member (i.e. the fastener 130) passes through the fastening hole 119 and the connecting fastening hole 124 aligned with each other, so as to connect the step segment 110 with the connection step segment 120.

In some other embodiments, the step segment 110 has two or more fastening holes 119 arranged at intervals along its length direction, and the connection step segment 120 has two or more connecting fastening holes 124 arranged at intervals along its length direction. The fastening holes 119 may be selectively aligned with the connecting fastening holes 124, and the fastener 130 passes through the fastening hole 119 and the connecting fastening hole 124 aligned with each other, so as to connect the step segment 110 with the connection step segment 120.

As an example, in FIG. 1-FIG. 30, the connecting fastening holes 124 are arranged in an inner side wall of the connection step segment 120, and an inner side wall 1172 of the step segment 110 has two fastening holes 119 which are respectively adjacent to both ends of the step segment 110. The fastener 130 is a threaded member. At least one of the first step segment 110A and the second step segment 110B is slid relative to the connection step segment 120 to adjust their relative positions, so that the fastening holes 119 are aligned with the corresponding connecting fastening holes 124 in an inner-outer direction. The threaded member (i.e. the fastener 130) sequentially passes through the fastening hole 119 and the connecting fastening hole 124 aligned with the fastening hole 119 in the direction from the inside to the outside, and thus the step 100 with a desired length is assembled and obtained. To adjust the length of the step 100 or disassemble the step 100, the threaded member may be removed, and the process of adjustment and disassembling is simple and convenient.

In some embodiments, at least one of the step segment 110 and the connection step segment 120 may include a limiting component for limiting the maximum sliding distance between the step segment 110 and the connection step segment 120.

Figure 2:
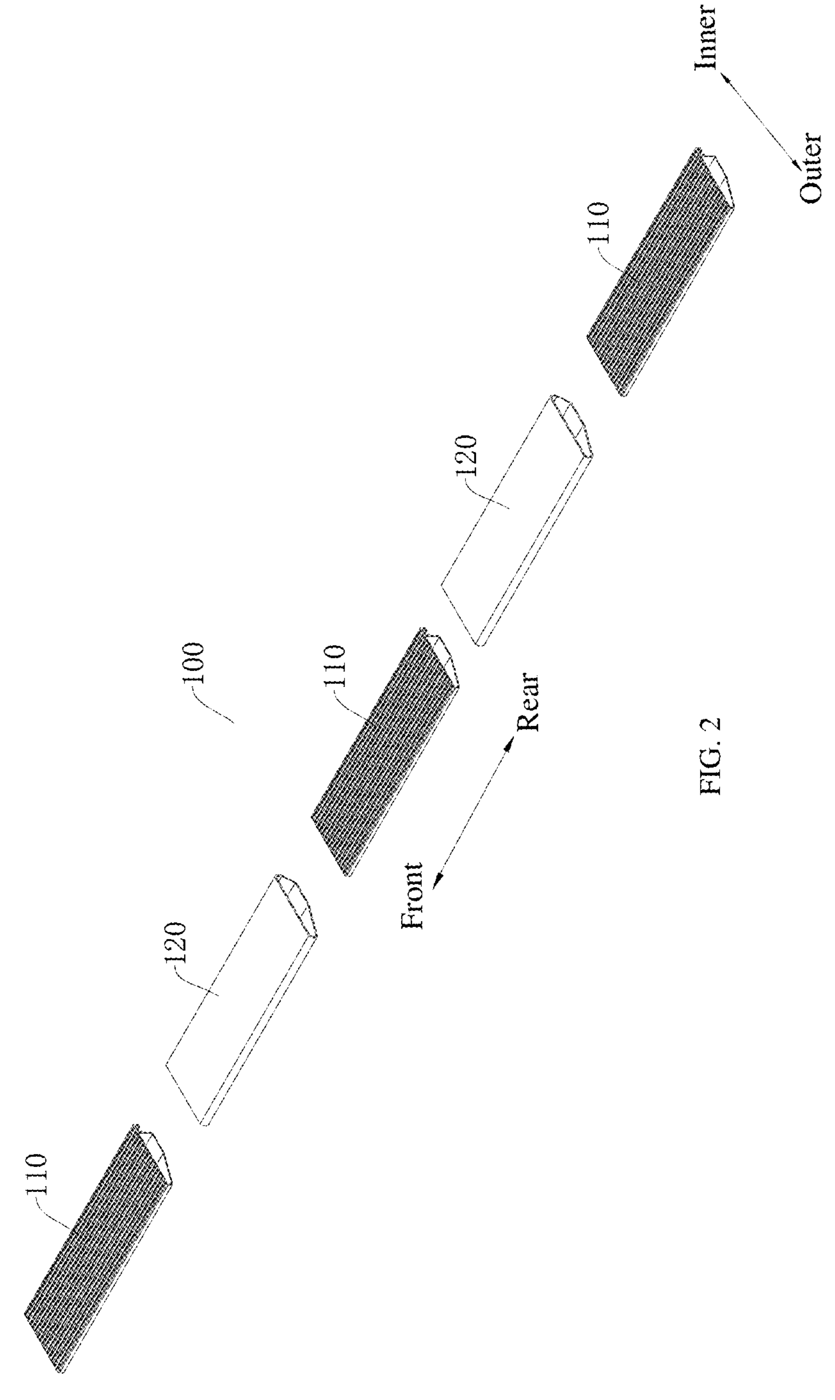
FIG. 2 is another perspective view of the step shown in FIG. 1.

In the embodiments shown in FIG. 1 and FIG. 2, the step 100 includes three step segments 110 and two connection step segments 120. It may be understood that the present disclosure is not limited to this, and the step 100 may include any number of step segments 110 and connection step segments 120. Advantageously, the step 100 includes two step segments 110 and one connection step segment 120, thereby meeting the needs of most vehicles. The step 100 has a small number of parts, and accordingly, the assembly and disassembly thereof is simple and the cost is low:

An example of the step 110 is described below: The step includes two step segments 110 and one connection step segment 120.

As shown in FIG. 3-FIG. 26, the step 100 of the embodiments of the present disclosure includes two step segments 110 and one connection step segment 120. The two step segments 110 include a first step segment 110A and a second step segment 110B. A first end 121 of the connection step segment 120 is slidably and detachably connected with the first step segment 110A. A second end 122 of the connection step segment 120 is slidably and detachably connected to the second step segment 110B.

Figure 3:
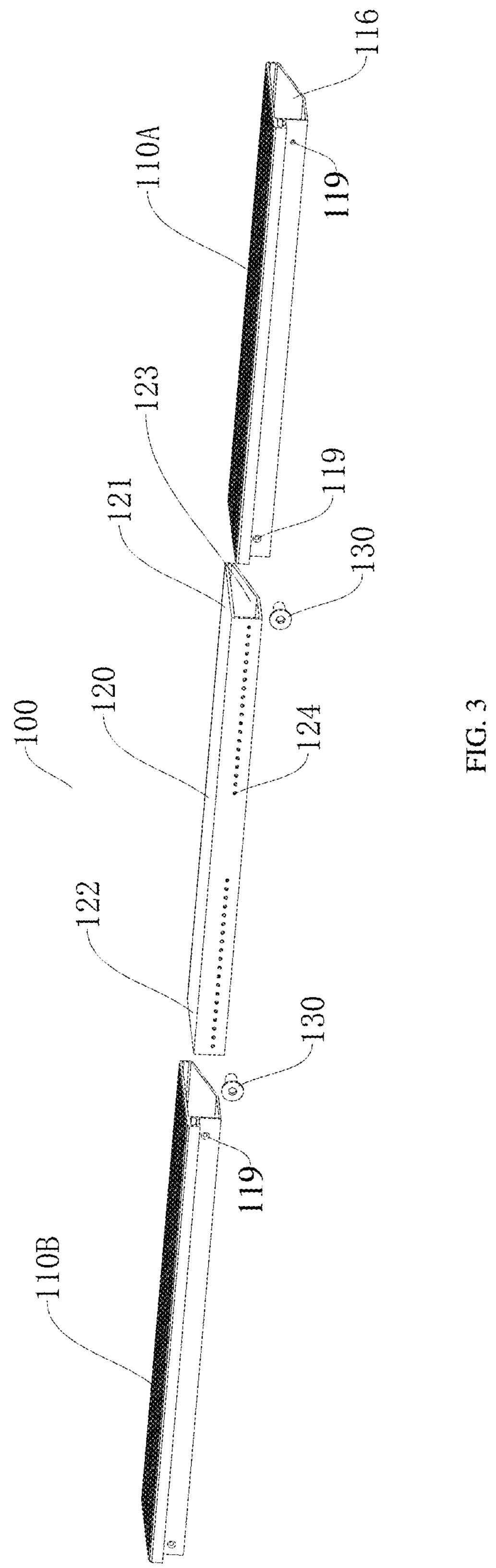
FIG. 3 is a perspective view of a step according to another embodiment of the present disclosure.
Figure 4:
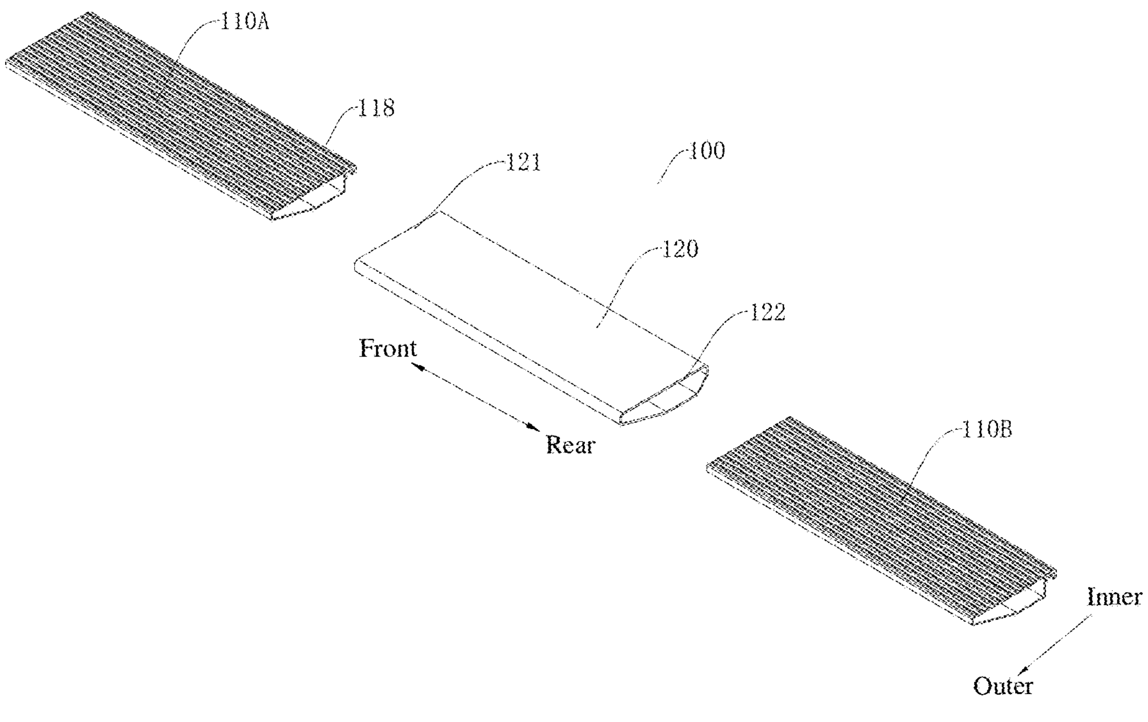
FIG. 4 is another perspective view of the step shown in FIG. 3.

As shown in FIG. 3 and FIG. 4, FIG. 4 shows an exploded view of the step 100 before assembly, and the first step segment 110A, the second step segment 110B and the connection step segment 120 are arranged along a length direction of the step 100. In FIG. 4, the first step segment 110A is located in front of the second step segment 110B, and the connection step segment 120 is located between the first step segment 110A and the second step segment 110B in a front-rear direction. Therefore, the first end 121 of the connection step segment 120 may be referred to as a front end, and the second end 122 of the connection step segment 120 may be referred to as a rear end. The "front-rear" direction refers to a front-rear direction of the vehicle, in which the front is near the front of the vehicle, and the rear is near the rear of the vehicle.

The first step segment 110A and the second step segment 110B may have the same structure, so that the positions of the first step segment 110A and the second step segment 110B may be exchangeable, and the first step segment 110A and the second step segment 110B may be manufactured by using molds of the same specifications, thus facilitating the production and assembling of the step 100, decreasing the number and type of the molds for producing the step segments 110, and reducing the costs.

It may be understood that the number of the step segments 110 is not limited to two and the number of the connection step segments 120 is not limited to one. For example, as shown in FIG. 1 and FIG. 2, there are three step segments 110 and two connection step segments 120, and the three step segments 110 may have the same structure, that is, the three step segments 110 may be manufactured with the molds of the same specifications, and the three step segments 110 may be exchangeable. The two connection step segments 120 may also have the same structure, and the two connection step segments 120 may be exchangeable and may be produced with the same mold, thus further decreasing the number of the molds and reducing the costs. The numbers of the step segments 110 and the connection step segments 120 may be set according to needs, for example, the larger the length of the step 100, the greater the numbers of the step segments 110 and the connection step segments 120. The number of the step segments 110 is n, and then the number of the connection step segments 120 is n−1, in which n>2.

The relative positions of the first step segment 110A, the second step segment 110B and the connection step segment 120 may be adjusted, and an end of the first step segment 110A and an end of the second step segment 110B, which are opposite to each other, may be spaced apart from or abut against each other.

In some embodiments, as shown in FIG. 5-FIG. 6 and FIG. 9-FIG. 10, the end of the first step segment 110A and the end of the second step segment 110B, which are opposite to each other, are spaced apart from each other, so that a gap 114 is formed between the end of the first step segment 110A and the end of the second step segment 110B which are opposite to each other, and a portion of the connection step segment 120 is exposed from the gap 114.

Figure 9:
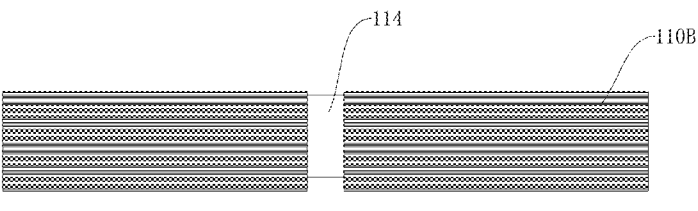
FIG. 9 is another top view of the step in an assembled state shown in FIG. 3, in which a length of the step is shortened.
Figure 10:
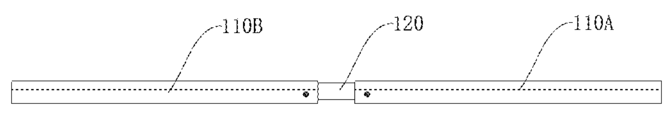
FIG. 10 is a side view of the step shown in FIG. 9.

By sliding the first step segment 110A and/or the second step segment 110B relative to the connection step segment 120, a length of the gap 114 may be adjusted, thereby adjusting the length of the step 100. Specifically, as shown in FIG. 5 and FIG. 6, the length of the gap 114 formed between the end of the first step segment 110A and the end of the second step segment 110B which are opposite to each other is large, a length of the portion of the connection step segment 120 exposed from the gap 114 is large, and the length of the step 100 is large. As shown in FIG. 9 and FIG. 10, the length of the gap 114 formed between the first step segment 110A and the second step segment 110B (specifically, between the end of the first step segment 110A and the end of the second step segment 110B which are opposite to each other) is small, the length of the portion of the connection step segment 120 exposed from the gap 114 is small, and the length of the step 100 is shortened.

Figure 11:
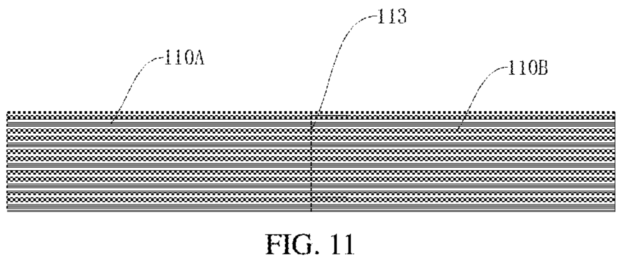
FIG. 11 is another top view of the step in the assembled state as shown in FIG. 3, in which a first step segment and a second step segment of the step abut against each other.
Figure 12:
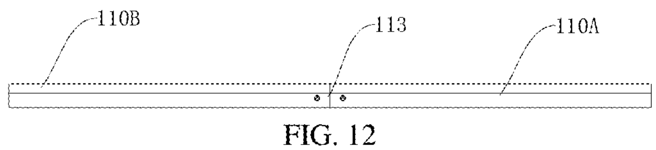
FIG. 12 is a side view of the step shown in FIG. 11.

In some other embodiments, as shown in FIG. 11 and FIG. 12, the end of the first step segment 110A and the end of the second step segment 110B, which are opposite to each other, abut against each other, so that a slit 113 is formed between the end of the first step segment 110A and the end of the second step segment 110B which are opposite to each other. It may be understood that when the end of the first step segment 110A and the end of the second step segment 110B, which are opposite to each other, abut against each other, the length of the step 100 is the shortest length of the assembled step 100. It should be noted that the slit 113 may be much smaller than the gap 114 herein.

As shown in FIG. 3-FIG. 26, the length of the first step segment 110A is equal to the length of the second step segment 110B, and the first step segment 110A and the second step segment 110B are symmetrical relative to the slit 113 or the gap 114 therebetween.

In some embodiments, as shown in FIG. 3-FIG. 26, the lengths of the first step segment 110A, the second step segment 110B and the connection step segment 120 are approximately the same. As shown in FIG. 13-FIG. 15, to facilitate handling and transporting the step 100, the first step segment 110A, the second step segment 110B and the connection step segment 120 are stacked together after being detached, and the ends of the three segments are substantially aligned, thus further improving the convenience of handling and transportation thereof.

As shown in FIG. 5 and FIG. 6, FIG. 9 and FIG. 10, FIG. 11 and FIG. 12, the connection step segment 120 is symmetrical relative to the slit 113 or the gap 114 between the first step segment 110A and the second step segment 110B, that is, the length of the overlapping part between the connection step segment 120 and the first step segment 110A is equal to the length of the overlapping part between the connection step segment 120 and the second step segment 110B. Therefore, when the first step segment 110A and the second step segment 110B are slid relative to the connection step segment 120 to adjust the length of the step 100, a relative sliding distance of the first step segment 110A is consistent with a relative sliding distance of the second step segment 110B, so that the step 100 retains its symmetry in structure. Thus, the step 100 has a reasonable structure, is subject to a uniform force, and has a great structural stability.

In some other embodiments, the length of the connection step segment 120 is greater than half of the length of the first step segment 110A and greater than half of the length of the second step segment 110B.

In some embodiments, as shown in FIG. 3-FIG. 26, the step segment 110 is hollow; and the step segment 110 has a longitudinal hole (may also be called a cavity) 116 extending along its length direction. The first end 121 of the connection step segment 120 is slidably fitted in the longitudinal hole 116 of the first step segment 110A, and the second end 122 of the connection step segment 120 is slidably fitted in the longitudinal hole 116 of the second step segment 110B. As shown in FIG. 6 and FIG. 10, in an assembled state, upper surfaces of the first step segment 110A and the second step segment 110B of the step 100 are both higher than an upper surface of the connection step segment 120. To disassemble the step 100, the fastener 130 is removed, the first end 121 of the connection step segment 120 is withdrawn from the longitudinal hole 116 of the first step segment 110A, and the second end 122 of the connection step segment 120 is withdrawn from the longitudinal hole 116 of the second step segment 110B.

The step segment 110 is configured to be hollow; which can reduce the weight of the step segment 110 and the material needed for manufacturing, and reduce the costs.

Figure 8:
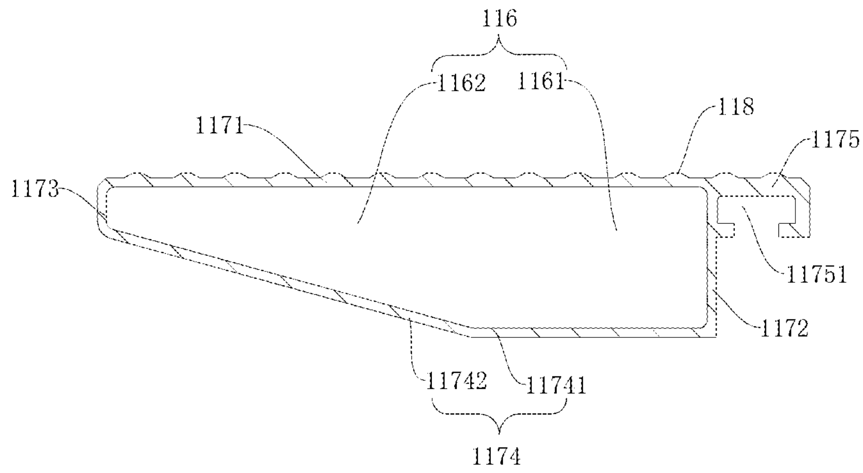
FIG. 8 is a cross-sectional view along line B-B in FIG. 6.

FIG. 8 shows a cross-sectional view of the first step segment 110A. As shown in FIG. 8, the step segment 110 includes a top wall 1171, an inner side wall 1172, an outer side wall 1173 and a bottom wall 1174. The top wall 1171 is located above the bottom wall 1174 and opposite to the bottom wall 1174 in a vertical direction, the inner side wall 1172 is a side wall near the vehicle body of the vehicle, the outer side wall 1173 is a side wall away from the vehicle body, and the top wall 1171, the inner side wall 1172, the outer side wall 1173 and the bottom wall 1174 together define the longitudinal hole 116.

As shown in FIG. 8, an outer contour of a cross-section of the step segment 110 and a contour of a cross section of the longitudinal hole 116 are polygons similar to each other, and the step segment 110 is a hollow body having a peripheral wall with a roughly uniform thickness. In other words, wall thicknesses of the top wall 1171, the inner side wall 1172, the outer side wall 1173 and the bottom wall 1174 of the step segment 110 are approximately equal, thus facilitating the design and production of the mold of the step segment 110 and reducing the manufacturing difficulty of the step segment 110.

As shown in FIG. 8, the step segment 110 also includes an extension part 1175 extending from the top wall 1171 and an upper part of the inner side wall 1172. The extension part 1175 may increase the dimension of the step segment 110 in the inner-outer direction, thus contributing to improving the structural strength of the step segment 110 and facilitating the installation of the step 100. The extension part 1175 has a groove 11751 therein, and a reinforcing member may be arranged in the groove 11751 to further enhance the structural strength of the step segment 110 and the step 100.

As shown in FIG. 8, in order to facilitate stepping, an upper surface of the top wall 1171 is roughly parallel to the horizontal plane. Further, an upper surface of the extension part 1175 is flush with the upper surface of the top wall 1171, which can increase the total area of the upper surface of the step 100 for stepping.

As shown in FIG. 4 and FIG. 8, the upper surface of the step segment 110 is provided with a plurality of protrusions 118, which may be configured as convex bars extending along a length direction of the step segment 110, and the protrusions 118 may increase the roughness of the upper surface of the step segment 110 and have a non-slip effect. In some other embodiments, the protrusions 118 may be other structures, such as convex bumps, non-slip textures, etc.

In some embodiments, as shown in FIG. 3-FIG. 26, the connection step segment 120 may be hollow; and the connection step segment 120 has a connecting longitudinal hole (cavity) 123 extending along its length direction. The hollow structure of the connection step segment 120 can reduce the weight of the connection step segment 120, thus reducing the overall weight of the step 100. Moreover, the amount of consumables needed for manufacturing the connection step segment 120 is reduced, thus reducing the manufacturing cost of the connection step segment 120.

FIG. 7 shows a cross-sectional view of the overlapping part between the second step segment 110B and the connection step segment 120. As shown in FIG. 7, a part of the connection step segment 120 is fitted in the longitudinal hole 116 of the second step segment 110B. The inner side wall 1172 of the second step segment 110B is provided with a fastening hole 119, which is a through hole through the inner side wall 1172, and the side wall of the connection step segment 120 opposite the inner side wall 1172 has the connecting fastening hole 124, which is a threaded hole penetrating the side wall. The fastening hole 119 of the second step segment 110B is aligned with the connecting fastening hole 124 of the connection step segment 120, and the threaded member (i.e. the fastener 130) passes through the fastening hole 119 of the second step segment 110B and the connecting fastening hole 124 of the connection step segment 120, and is threadedly fitted into the connecting fastening hole 124, thus fastening the second step segment 110B and the connection step segment 120. In addition, an end of the fastening hole 119 has a countersunk hole to hide a head of the threaded member.

As shown in FIG. 7, an outer contour of a cross section of the connection step segment 120, a contour of a cross section of the connecting longitudinal hole 123, and a contour of a cross section of the longitudinal hole 116 of the step segment 110 are configured as polygons similar to each other. The outer contour of the cross section of the connection step segment 120 and the contour of the cross section of the connecting longitudinal hole 123 are configured as polygons similar to each other, so that the connection step segment 120 is configured as a hollow body having a peripheral wall with a roughly uniform thickness similar to the step segment 110, which facilitates the design and production of the mold of the connection step segment 120 and reduces the manufacturing difficulty of the connection step segment 120. The outer contour of the cross section of the connection step segment 120 and the contour of the cross section of the longitudinal hole 116 of the step segment 110 are configured as polygons similar to each other, so that the structural shape of the connection step segment 120 better matches with the longitudinal hole 116 of the step segment 110. In addition, both the step segment 110 and the connection step segment 120 are configured as a prism with a polygonal cross section. Compared with a plate structure, the prism structure is not easy to deform and has a high structural strength.

As shown in FIG. 7, an outer peripheral surface of the connection step segment 120 is in slidable contact with an inner peripheral surface of the longitudinal hole 116 of the step segment 110, so as to form a stable limiting relationship between the step segment 110 and the connection step segment 120, thus improving the structural stability of the step segment 100, and avoiding abnormal sound and loosening caused by an excessive gap between the step segment 110 and the connection step segment 120.

In some embodiments, as shown in FIG. 7 and FIG. 8, the cross section of each of the longitudinal hole 116 of the step segment 110 and the connecting longitudinal hole 123 of the connection step segment 120 includes a rectangular hole portion and a triangular or trapezoidal hole portion located on an outer side the rectangular hole portion. The "outer side" refers to a side away from the vehicle body, and the "inner side" refers to a side near the vehicle body.

As an example, as shown in FIG. 8, the longitudinal hole 116 of the step segment 110 includes a first rectangular hole portion 1161 and a first trapezoidal hole portion 1162, and the first trapezoidal hole portion 1162 is located on an outer side of the first rectangular hole portion 1161. The first rectangular hole portion 1161 is communicated with the first trapezoidal hole 1162 to form the longitudinal hole 116 with an inverted trapezoidal cross section. The bottom wall 1174 includes a flat bottom wall section 11741 and an inclined bottom wall section 11742, the flat bottom wall section 11741 is parallel to the top wall 1171, and the inclined bottom wall section 11742 extends upwards and outwards from the flat bottom wall section 11741, that is, the inclined bottom wall section 11742 extends outwards from the flat bottom wall section 11741 while inclining in a direction toward the top wall 1171, thus forming an included angle with the flat bottom wall section 11741. It may be understood that an upper surface of the flat bottom wall section 11741 is a bottom wall surface of the first rectangular hole portion 1161 of the longitudinal hole 116, and an upper surface of the inclined bottom wall section 11742 is a bottom wall surface of the first trapezoidal hole portion 1162. Therefore, a thickness of a side of the step segment 110 near the vehicle body is greater than a thickness of a side of the step segment 110 away from the vehicle body, that is, a height of the inner side wall 1172 is greater than a height of the outer side wall 1173, so as to facilitate the forming of the fastening hole 119 in the inner side wall 1172. After the step 100 is installed on the vehicle body, the structure is stable, and the fastening hole 119 is hidden from view; thus improving the appearance of the vehicle.

As shown in FIG. 7, the connecting longitudinal hole 123 includes a second rectangular hole portion 1231 and a second trapezoidal hole portion 1232, and the second trapezoidal hole portion 1232 is located on an outer side of the second rectangular hole portion 1231. The second rectangular hole portion 1231 and the second trapezoidal hole portion 1232 are connected to form the connecting longitudinal hole 123 with an inverted trapezoidal cross section, and the contour of the cross section of the connecting longitudinal hole 123 is similar to the contour of the cross section of the longitudinal hole 116. Therefore, a thickness of a side of the connection step segment 120 near the vehicle body is greater than a thickness of a side of the connection step segment 120 away from the vehicle body; so as to facilitate the forming of the connecting fastening hole 124 in the inner side wall of the connection step segment 120. After the step 100 is installed on the vehicle body, the structural strength is large, and the connecting fastening hole 124 is hidden from view; thus improving the appearance of the vehicle.

Figure 18:
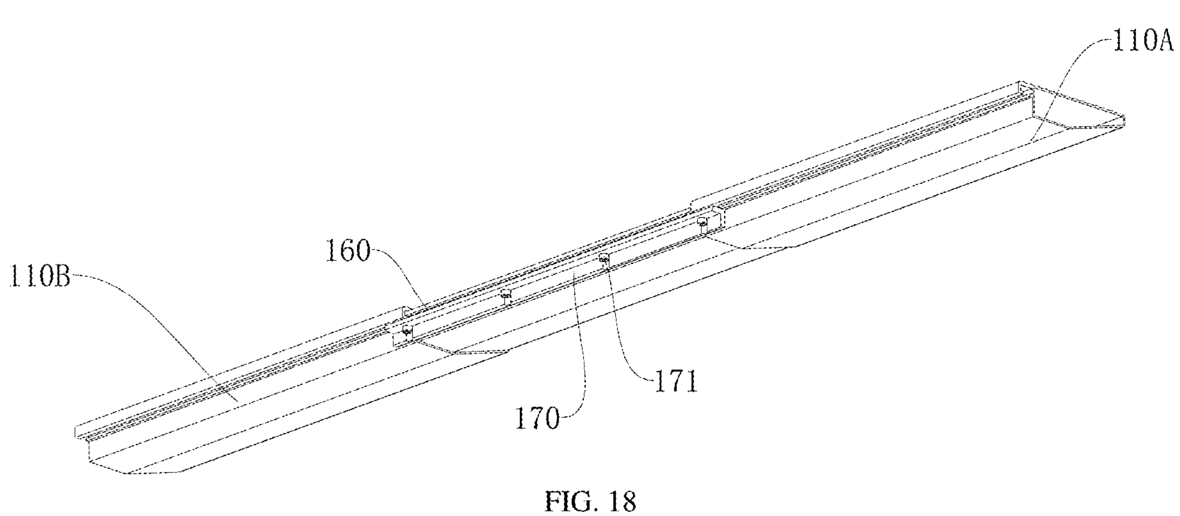
FIG. 18 is a perspective view of the step in an assembled state as shown in FIG. 16.
Figure 19:
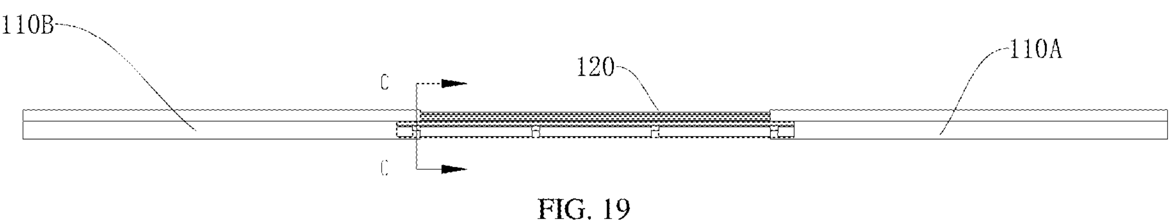
FIG. 19 is a side view of the step shown in FIG. 18.
Figure 20:
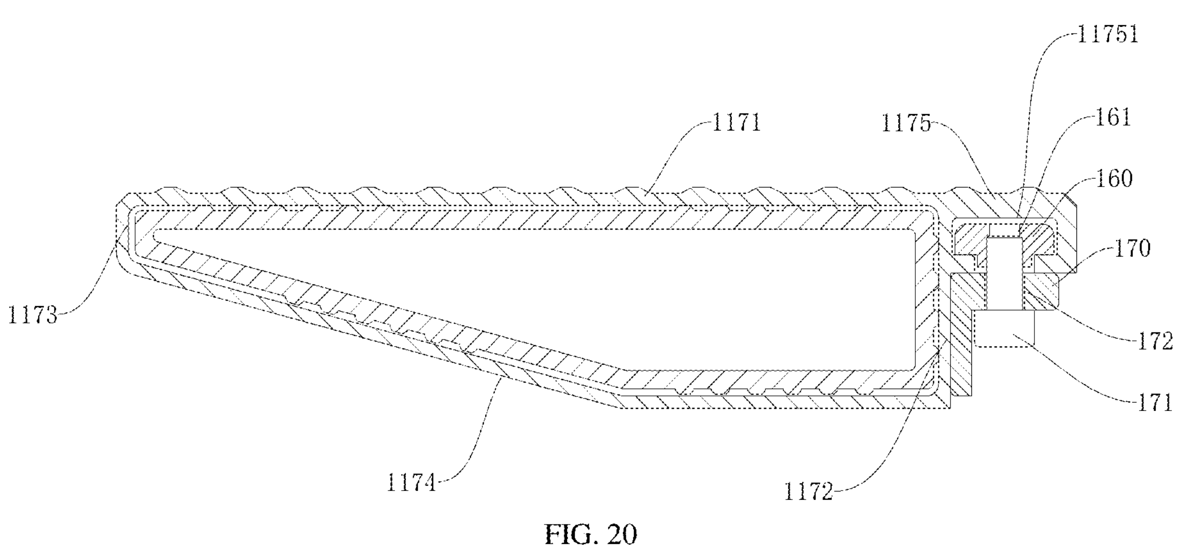
FIG. 20 is a cross-sectional view along line C-C in FIG. 19.
Figure 21:
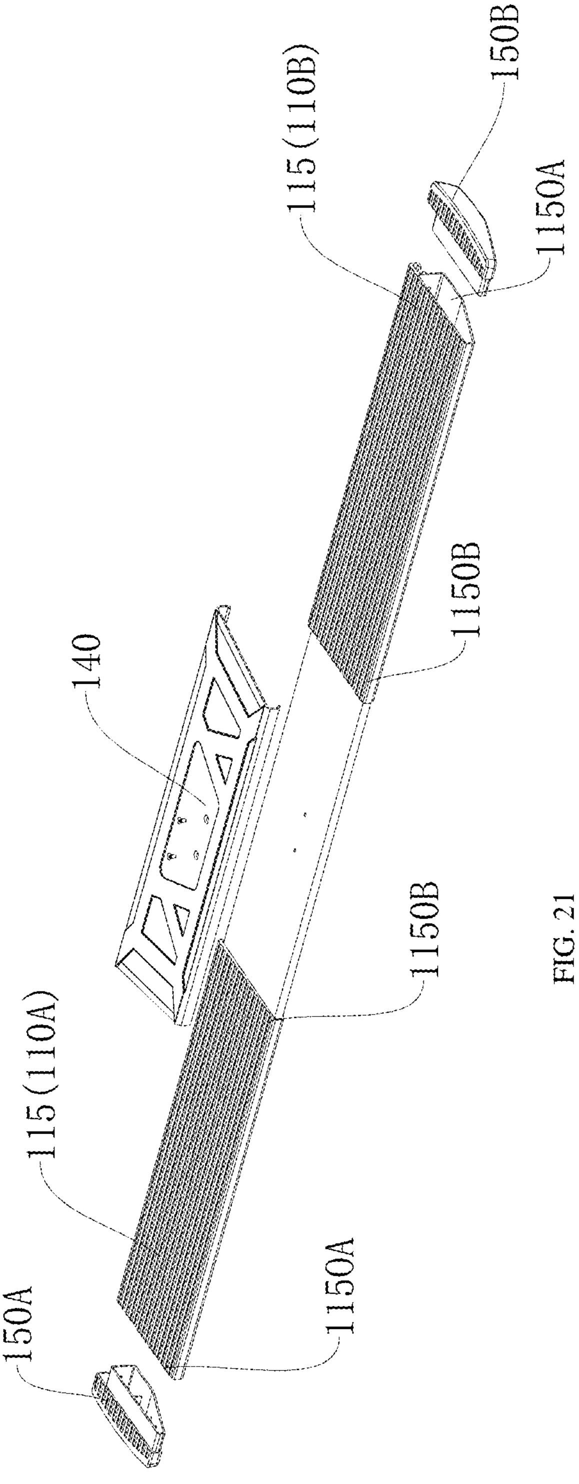
FIG. 21 is a perspective view of a step according to another embodiment of the present disclosure.
Figure 22:
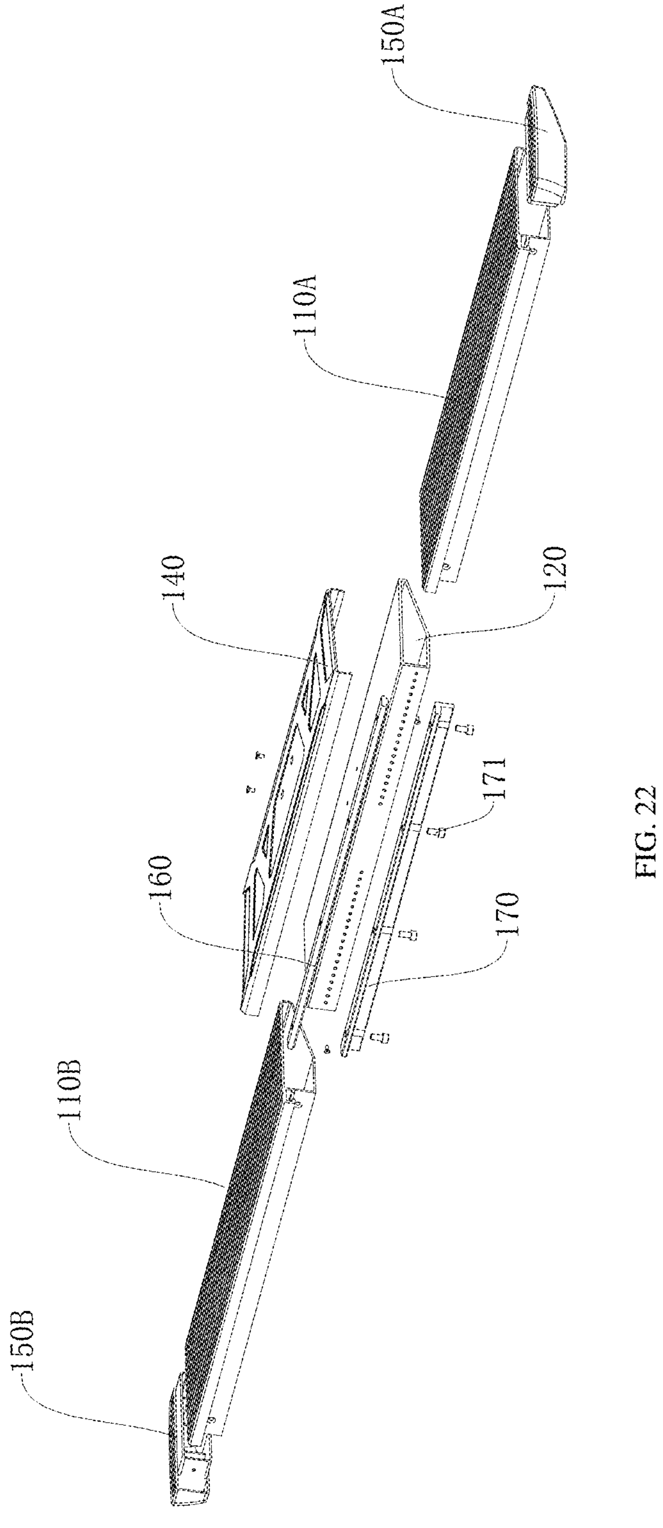
FIG. 22 is a perspective view of a step according to another embodiment of the present disclosure.
Figure 23:
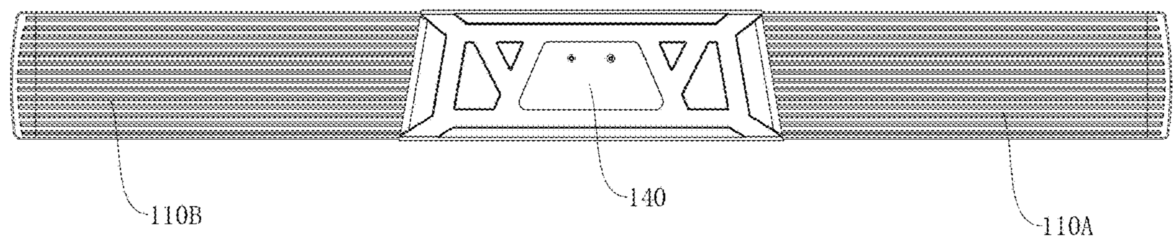
FIG. 23 is a top view of the step in an assembled state as shown in FIG. 22.
Figure 24:
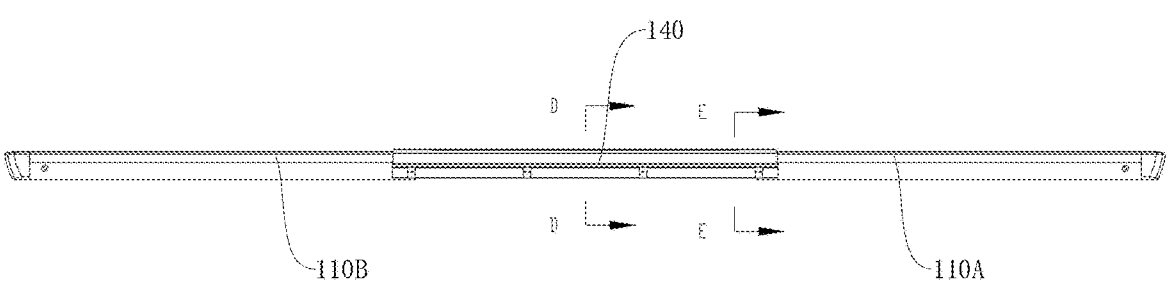
FIG. 24 is a side view of the step shown in FIG. 23.
Figure 25:
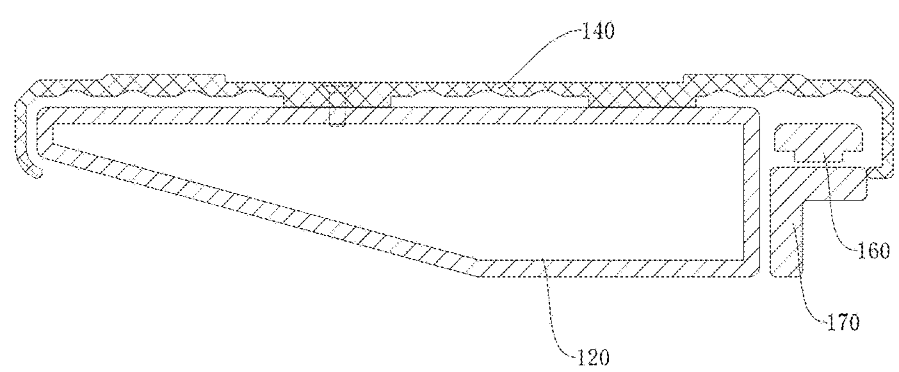
FIG. 25 is a cross-sectional view along line D-D in FIG. 24.

In some embodiments, as shown in FIG. 16-FIG. 20 and FIG. 22-FIG. 26, the step 100 further includes a reinforcing slat 160 and a locking slat 170. As shown in FIG. 20, the step segment 110 includes a top wall 1171, an inner side wall 1172, an outer side wall 1173, a bottom wall 1174, and an extension part 1175 extending from the top wall 1171 and an upper part of the inner side wall 1172. The top wall 1171 is located above the bottom wall 1174 and opposite to the bottom wall 1174 in the vertical direction, the inner side wall 1172 is a side wall relatively near the vehicle body, and the outer side wall 1173 is a side wall away from the vehicle body. As shown in FIG. 20, the extension part 1175 has a groove 11751 therein, the reinforcing slat 160 is fitted in the grooves 11751 of adjacent step segments 110, and the locking slat 170 is connected to the reinforcing slat 160 by a threaded piece 171 and is attached to the inner side wall 1172. The reinforcing slat 160 and the locking slat 170 further enhance the structural strength of the step 100 and improve the integrity of the step 100.

As an example, as shown in FIG. 16-FIG. 20, both the first step segment 110A and the second step segment 110B include the extension part 1175, the bottom of the extension part 1175 of each of the first step segment 110A and the second step segment 110B includes the groove 11751, and the groove 11751 has a T-shaped cross section. The reinforcing slat 160 has a T-shaped cross section matching with the groove 11751. As shown in FIG. 18 and FIG. 19, one end of the reinforcing slat 160 extends into the groove 11751 of the extension part 1175 of the first step segment 110A and is configured to slide relative to the groove 11751 of the extension part 1175 of the first step segment 110A, and the other end of the reinforcing slat 160 extends into the groove 11751 of the extension part 1175 of the second step segment 110B and is configured to slide relative to the groove 11751 of the extension part 1175 of the second step segment 110B. The reinforcing slat 160 has a plurality of threaded holes 161 arranged at intervals in its length direction. The locking slat 170 is located below the reinforcing slat 160. In the embodiments shown in FIG. 16-FIG. 20, the locking slat 170 has an inverted L shape, and the locking slat 170 has a plurality of mounting holes 172 arranged at intervals along its length direction. The plurality of mounting holes 172 are aligned one by one with the plurality of threaded holes 161 in the top-to-bottom direction, and the threaded piece 171 passes through the mounting hole 172 and the threaded hole 161 sequentially from the bottom to the top and is fitted into the threaded hole 161, to connect the locking slat 170 to the reinforcing slat 160. As shown in FIG. 20, an outer side surface of the locking slat 170 contacts the inner side wall 1172 of the step segment 110. With the cooperation of the reinforcing slat 160 and the locking slat 170, the connection between the first step segment 110A, the second step segment 110B and the connection step segment 120 is stable, and the integrity of the step 100 is great.

As shown in FIG. 18 and FIG. 20, the reinforcing slat 160 and the locking slat 170 span the gap or slit between the first step segment 110A and the second step segment 110B. In some embodiments, the locking slat 170 may have a plurality of through holes arranged along its length direction. To assemble the step 100, the fastener 130 passes through the through hole, the fastening hole 119 and the connecting fastening hole 124, thus further enhancing the integrity and structural strength of the step 100.

In some embodiments, as shown in FIGS. 21-26, the step 100 further includes a decorative cover plate 140. The decorative cover plate 140 is configured to cover the slit 113 or the gap 114 between adjacent step segments 110 to avoid the slit 113 or the gap 114 between adjacent step segments 110 from being observed from the outside, so that the step 100 has an aesthetic appearance. Specifically, when the end of the first step segment 110A and the end of the second step segment 110B, which are opposite to each other, abut against each other, the slit 113 is formed between the end of the first step segment 110A and the end of the second step segment 110B, and the decorative cover plate 140 covers the slit 113. When the end of the first step segment 110A and the end of the second step segment 110B, which are opposite to each other, are spaced part from each other, the gap 114 is formed between the end of the first step segment 110A and the end of the second step segment 110B, a part of the connection step segment 120 is exposed from the gap 114, and the decorative cover plate 140 covers the gap 114, that is, the decorative cover plate 140 covers the exposed part of the connection step segment 120. The decorative cover plate 140 may be snapped and/or screwed with the first step segment 110A and the second step segment 110B. In some embodiments, the decorative cover plate 140 may be connected with the connection step segment 120 by a screw and/or be snapped and/or screwed with the first step segment 110A and the second step segment 110B.

In some embodiments, as shown in FIGS. 21-26, the decorative cover plate 140 is an integrated structure, and the integrated decorative cover plate 140 is easy to manufacture and has a low cost.

In some other embodiments, the decorative cover plate 140 includes a plurality of cover plate strips, and the plurality of cover plate strips sequentially abut against or are connected with each other in a length direction of the connection step segment 120. The length of the decorative cover plate 140 may be adjusted by changing the number of the cover plate strips, and the length of the decorative cover plate 140 may be flexibly adjusted according to the length of the gap 114, so that the decorative cover plate 140 can better cover and hide the gap 114, thus improving the flexibility of the decorative cover plate 140 in practical application, and compensating for a height difference between the upper surfaces of the first step segment 110A and the second step segment 110B and the upper surface of the connection step segment 120.

In some embodiments, the length of the decorative cover plate 140 is greater than the length of the gap 114, and the decorative cover plate 140 covers the gap 114 and covers part of the first step segment 110A and/or of the second step segment 110B. For example, in the embodiments shown in FIGS. 21-26, the decorative cover plate 140 is covered above the gap 114, two ends of the decorative cover plate 140 respectively extend forward and backward beyond two ends of the gap 114, a part of the decorative cover plate 140 is covered on the first step segment 110A, and another part of the decorative cover plate 140 is covered on the second step segment 110B.

Figure 26:
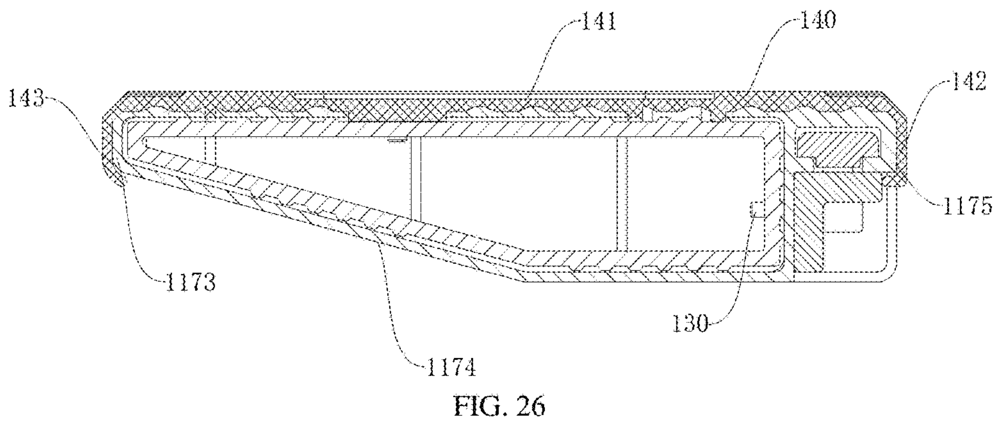
FIG. 26 is a cross-sectional view along line E-E in FIG. 24.

As shown in FIG. 26, the decorative cover plate 140 includes a top plate 141, an inner flange 142 and an outer flange 143. The top plate 141 is covered above the slit 113 or the gap 114, the inner flange 142 extends downwards and then outwards from an inner edge of the top plate 141 (an edge near a vehicle body 310) and catches the extension part 1175 of the first step segment 110A and the extension part 1175 of the second step segment 110B, and the outer flange 143 extends downwards and then inwards from an outer edge of the top plate 141 (an edge away from the vehicle body 310) and catches the bottom wall 1174 of the first step segment 110A and the bottom wall 1174 of the second step segment 110B. The arrangement of the decorative cover plate 140 improve the aesthetic appearance of the step 100, and the enveloping of the inner flange 142 and the outer flange 143 makes the decorative cover plate 140 "caught" on the first step segment 110A and the second step segment 110B, and enhances the structural strength of the step 100.

As an example, as shown in FIGS. 21-26, the decorative cover plate 140 includes a top plate 141, an inner flange 142 connected to an inner edge of the top plate 141, and an outer flange 143 connected to an outer edge of the top plate 141. The top plate 141 is covered above the gap 114 and extends forward and backward beyond two sides of the gap 114, respectively, thus covering part of the first step segment 110A and part of the second step segment 110B. The inner flange 142 of the decorative cover plate 140 forms an enveloping structure to envelop a portion of the extension part 1175 of each of the first step segment 110A and the second step segment 110B, and the outer flange 143 of the decorative cover plate 140 forms an enveloping structure to envelop part of the outer side of each of the first step segment 110A and the second step segment 110B. Thus, in appearance, the gap 114 is completely hidden.

In some other embodiments, the length of the decorative cover plate 140 is equal to the length of the gap 114, and the decorative cover plate 140 is arranged on the connection step segment 120 to compensate for the height difference between the step segment 110 and the connection step segment 120. The two opposite ends of the decorative cover plate 140 in the length direction of the connection step segment 120 abut against the first step segment 110A and the second step segment 110B, respectively. By arranging the decorative cover plate 140 in the gap 114, an upper surface of the decorative cover plate 140 is substantially flush with the upper surface of the first step segment 110A and the upper surface of the second step segment 110B, so that the step 100 has a good sense of use.

In some embodiments, the step 100 further includes a closure head 150, the plurality of step segments 110 of the step 100 include two end step segments 115, and the end step segment 115 refers to a step segment 110 located at either end of the step 100. It may be understood that in the case that the step 100 includes two step segments 110, the first step segment 110A and the second step segment 110B are also referred to as the two end step segments 115. The end step segment 115 has a free end 1150A and a connecting end 1150B, the connecting end 1150B is connected to the connection step segment 120, and the closure head 150 is detachably mounted to the free end 1150A of the end step segment 115, or the closure head 150 and the end step segment 115 are integrated. The closure head 150 closes the two ends of the step 100 to make the step 100 more beautiful in appearance.

Specifically, as shown in FIGS. 21-26, the step 100 includes two closure heads 150, namely a first closure head 150A and a second closure head 150B. A part of the first closure head 150A is inserted in an opening of a free end of the first step segment 110A (i.e. in the longitudinal hole 116 of the first step segment 110A at the free end of the first step segment 110A) to block the opening of the free end of the first step segment 110A, and another part of the first closure head 150A is located outside the longitudinal hole 116. The height of the upper surface of the other part of the first closure head 150A is substantially consistent with the height of the upper surface of the first step segment 110A.

A part of the second closure head 150B is inserted in an opening of a free end of the second step segment 110B (i.e. in the longitudinal hole 116 of the second step segment 110B at the free end of the second step segment 110B) to block the opening of the free end of the second step segment 110B, and another part of the second closure head 150B is located outside the longitudinal hole 116. The height of the upper surface of the other part of the second closure head 150B is substantially consistent with the height of the upper surface of the second step segment 110B. Moreover, the first step segment 110A and the second step segment 110B are symmetrical with respect to the slit 113 or the gap 114 therebetween, and the first closure head 150A and the second closure head 150B are symmetrical with respect to the slit 113 or the gap 114.

In the embodiments shown in FIGS. 1-26, the step segment 110 is hollow and has the longitudinal hole 116 extending along its length direction, the connection step segment 120 is hollow and has the connecting longitudinal hole 123 extending along its length direction, the first end 121 of the connection step segment 120 is slidably fitted in the longitudinal hole 116 of the first step segment 110A, and the second end 122 of the connection step segment 120 is slidably fitted in the longitudinal hole 116 of the second step segment 110B.

In some other embodiments, as shown in FIGS. 27-30, the step segment 110 is hollow and has the longitudinal hole 116 extending along its length direction, and the connection step segment 120 is hollow and has the connecting longitudinal hole 123 extending along its length direction. The end of the first step segment 110A and the end of the second step segment 110B, which are opposite to each other, are slidably fitted in the connecting longitudinal hole 123. That is, the end of the first step segment 110A near the second step segment 110B extends into the opening of the first end 121 of the connection step segment 120 and is slidable along the connecting longitudinal hole 123. The end of the second step segment 110B near the first step segment 110A extends into the opening of the second end 122 of the connection step segment 120 and is slidable along the connecting longitudinal hole 123. Both the step segment 110 and the connection step segment 120 are configured as hollow structures, which can reduce the overall weight and the material consumption of the step 100, and further facilitate handling and transportation. In this embodiment, the fastening of the first step segment 110A and the second step segment 110B with the connection step segment 120 may be achieved in the same manner as in the above embodiments.

It may be understood that in these embodiments, the upper surfaces of the first step segment 110A and the second step segment 110B are lower than the upper surface of the connection step segment 120.

As shown in FIG. 28, both of the length of the part of the first step segment 110A extending into the connecting longitudinal hole 123 and the length of the part of the second step segment 110B extending into the connecting longitudinal hole 123 are short. The distance between the end of the first step segment 110A and the end of the second step segment 110B which are opposite to each other is large, and the length of the step 100 is large. As shown in FIG. 29, the first step segment 110A and the second step segment 110B continue to extend inward into the connecting longitudinal hole 123, so as to reduce the distance between the end of the first step segment 110A and the end of the second step segment 110B which are opposite to each other, and shorten the length of the step 100.

As shown in FIGS. 28 and 29, the length of the part of the first step segment 110A extending into the connecting longitudinal hole 123 is equal to the length of the part of the second step segment 110B extending into the connecting longitudinal hole 123. The part of the first step segment 110A located outside the connecting longitudinal hole 123 and the part of the second step segment 110B located outside the connecting longitudinal hole 123 are symmetrical with respect to the connection step segment 120, so that the step 100 as a whole is configured as a symmetrical structure.

As shown in FIG. 30, the outer contour of the cross section of the step segment 110, the contour of the cross section of the longitudinal hole 116, and the contour of the cross section of the connecting longitudinal hole 123 are configured as polygons similar to each other. The outer contour of the cross section of the step segment 110 and the contour of the cross section of the longitudinal hole 116 are configured as polygons similar to each other, so that the step segment 110 is configured as a hollow body having a peripheral wall with a roughly uniform thickness, thus facilitating the manufacturing of the step segment 110. The outer contour of the cross section of the step segment 110 and the contour of the cross section of the connecting longitudinal hole 123 are configured as polygons similar to each other, so that the structural shape of the step segment 110 better matches with the connecting longitudinal hole 123 of the connection step segment 120. In addition, both the step segment 110 and the connection step segment 120 are configured as a prism with a polygonal cross section. Compared with the plate structure, the prism is not easy to deform and has a high structural strength.

As shown in FIG. 30, the outer peripheral surface of the step segment 110 is in slidable contact with the inner peripheral surface of the connecting longitudinal hole 123 of the connection step segment 120 to form a stable limiting relationship between the step segment 110 and the connection step segment 120, thus improving the structural stability of the step 100, and avoiding loose fit and abnormal sound caused by an excessive gap between the step segment 110 and the connection step segment 120.

In some other embodiments, one of the step segment 110 and the connection step segment 120 including a sliding groove or a sliding hole, and the end of the other one of the step segment 110 and the connection step segment 120 is slidably fitted in the sliding groove or the sliding hole, so that the first step segment 110A and the second step segment 110B are slidably and detachably connected with the connection step segment 120. For example, the connection step segment 120 has a sliding groove open downwards, and an extension direction of the sliding groove is the same as the extension direction of the connection step segment 120. The sliding groove is open at both ends of the connection step segment 120 to form an opening. Opposite ends of two step segments 110 adjacent to the connection step segment 120 extend into the sliding groove from the openings at both ends of the sliding groove, respectively, and are slidable relative to the sliding groove. As another example, the connection step segment 120 has a sliding hole extending along its length direction, and the sliding hole is open at both ends of the connection step segment 120 to form an opening. Opposite ends of two step segments 110 adjacent to the connection step segment 120 extend into the sliding hole from the openings at both ends of the sliding hole, respectively, and are slidable relative to the sliding hole.

In the step 100 of the embodiments of the present disclosure, the step segments 110 are slidably and detachably connected through the connection step segment 120, the step segment 110 and the connection step segment 120 can be detached and separated for convenient handling and transportation, and the length of the step 100 can be adjusted by sliding the step segment 110 relative to the connection step segment 120. The step 100, or a portion thereof, is standardized and has a wide range of applications.

Moreover, in the step 100 of the embodiments of the present disclosure, adjacent step segments 110 are assembled and connected by the connection step segment 120. Compared with the way of directly connecting two step bodies in the related art, the step 100 of the embodiments of the present disclosure may adopt the step segments 110 of the same specifications, that is, the plurality of step segments 110 may have the same structure, so that the step segments 110 may be produced by molds of the same specifications, thus reducing the number of the molds and reducing the manufacturing costs. Moreover, due to the same specification, the step segments 110 may be exchangeable with each other for convenient assembling, maintenance and replacement. In addition, when a plurality of connection step segments 120 are used, the connection step segments 120 may have the same specifications, so that the same mold may be used for production, thus further reducing the costs. In addition, in the embodiments of the present disclosure, the length of the step 100 can be adjusted by sliding the step segment 110 and the connection step segment 120 relative to each other, and also the steps of different lengths can be assembled by adjusting the numbers of the step segments 110 and the connection step segments 120, so as to further improve the adjustment range of the step length and enhance the applicability of the step.

A step device 200 in embodiments of the present disclosure is described below:

As shown in FIGS. 31-34, the step device 200 includes a linkage mechanism 210 and a step. The step is the step 100 in the above embodiments, and the step 100 is connected to the linkage mechanism 210 to move between an extended position and a retracted position driven by the linkage mechanism 210.

Figure 35:
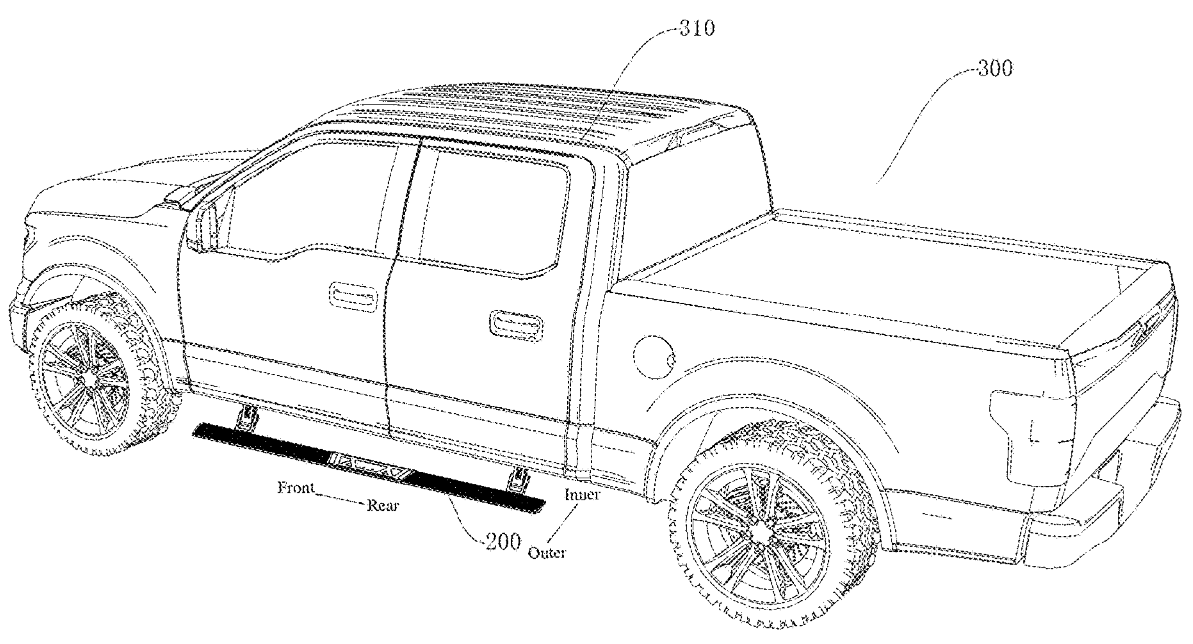
FIG. 35 is a perspective view of a vehicle according to an embodiment of the present disclosure.
Figure 36:
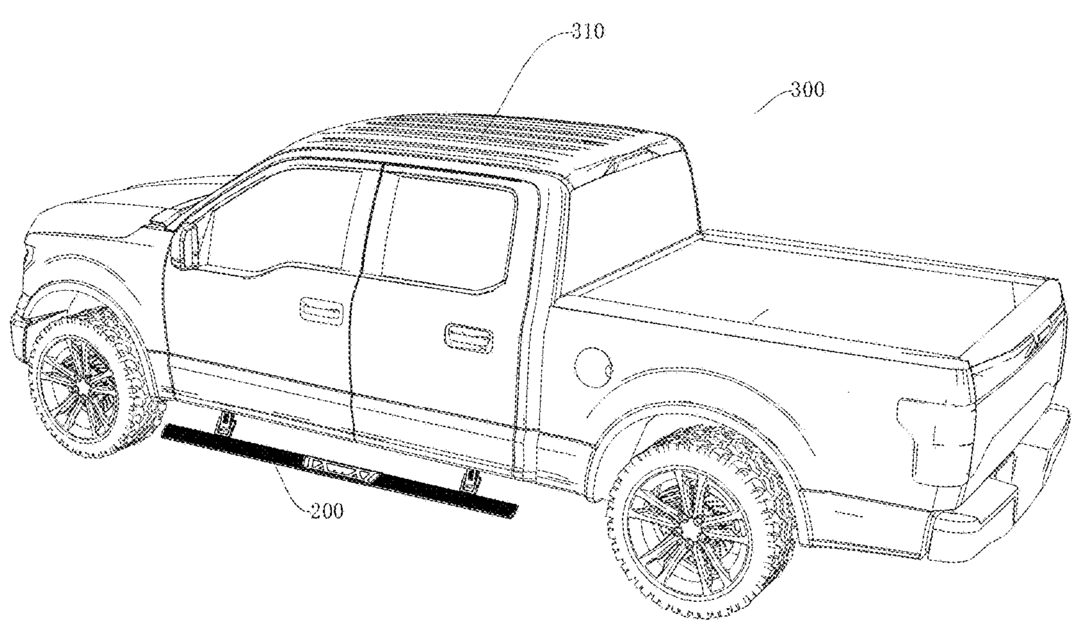
FIG. 36 is another perspective view of a vehicle according to an embodiment of the present disclosure.

FIG. 35 and FIG. 36 show a vehicle 300 in embodiments of the present disclosure. As shown in FIG. 35 and FIG. 36, the vehicle 300 includes a vehicle body 310 and a step device 200, and the step device 200 is mounted on at least one side of the vehicle body 310 and/or a rear of the vehicle body 310. The length of the step 200 as shown in FIG. 35 is small, while the length of the step 200 as shown in FIG. 36 is large.

As shown in FIGS. 31-34, the linkage mechanism 210 includes a mounting base 211, a step base 212 and an arm assembly 213. The step 200 is mounted on the step base 212, and the mounting base 211 is configured to be mounted on an underside of the vehicle body 310. The arm assembly 213 is connected between the mounting base 211 and the step base 212 to drive the step 200 to move between the extended position and the retracted position. For example, the arm assembly 213 may be pivotally connected to the mounting base 211 and the step base 212, respectively, and the arm assembly 213 drives the step 200 to move between the extended position and the retracted position under the drive of a driving device (such as a motor, more advantageously, a brushless DC motor).

In some embodiments, in the retracted position, the step 200 rests against a lower edge of the side of the vehicle body 310. For example, the step 200 is oriented vertically and rests against the lower edge of the side of the vehicle body 310, so that the step 200 covers the lower edge of the vehicle body 310 to protect the lower edge of the vehicle body 310.

In some other embodiments, in the retracted position, the step 200 leans against the junction between the underside of the vehicle body 310 and the side of the vehicle body 310. In other words, the step 200 is inclined with respect to the vehicle body 310 and rests against the junction between the underside of the vehicle body 310 and the side of the vehicle body 310, so that the step 200 can cover an outer edge of the underside of the vehicle body 310 and the lower edge of the side of the vehicle body 310. Therefore, the step 200 may be used as a bumper of the vehicle to provide a protective function, thus protecting the vehicle body 310 and preventing the vehicle 300 from being hit or scratched.

Figure 31:
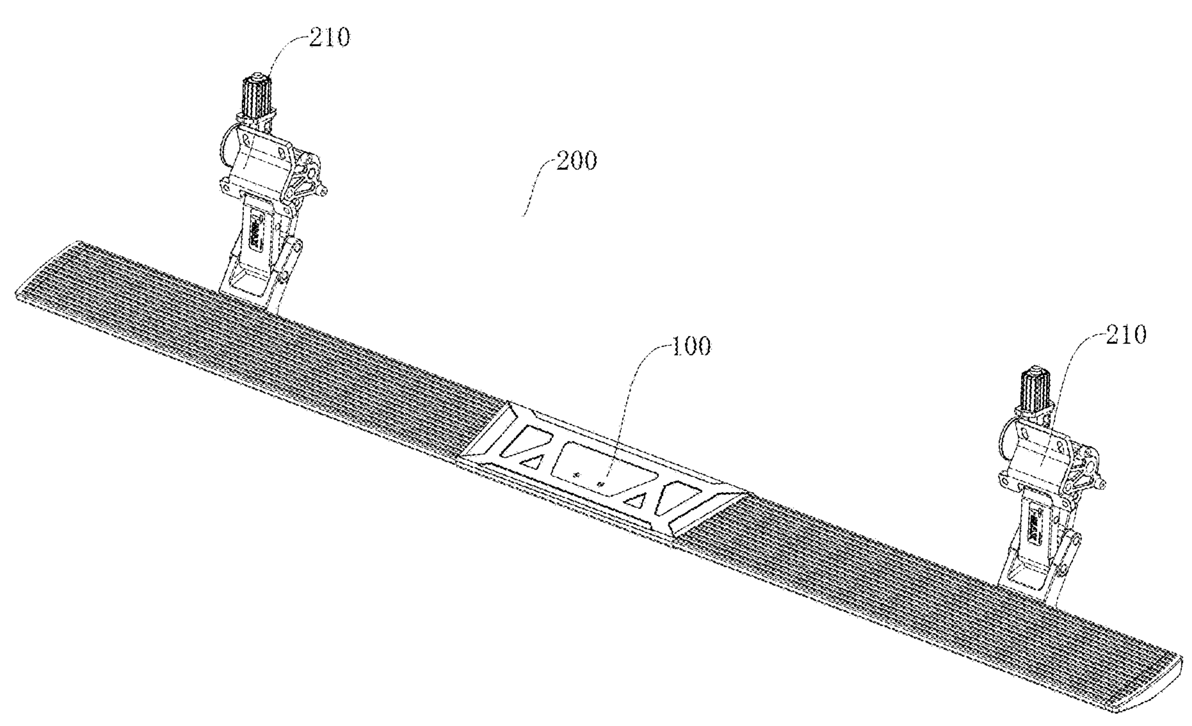
FIG. 31 is a perspective view of a step device according to an embodiment of the present disclosure.

In some embodiments, two linkage mechanisms 210 are provided and arranged at intervals along the length direction of the step 200. For example, as shown in FIG. 31, the two linkage mechanisms 210 are spaced apart by an interval in the front-rear direction and are connected to the inner sides of the first step segment 110A and the second step segment 110B, respectively.

In some embodiments, the arm assembly 213 may be a four-bar linkage, a five-bar linkage or a six-bar linkage.

Figure 32:
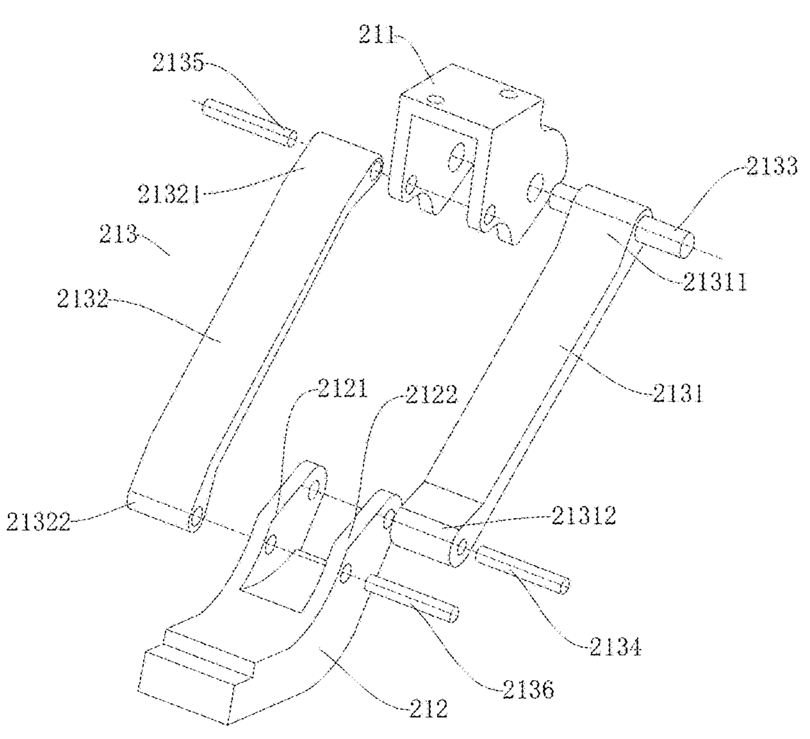
FIG. 32 showing an example of a linkage mechanism for a step device according to an embodiment of the present disclosure.

Specifically, as shown in FIG. 32, the arm assembly 213 is a four-bar linkage. The arm assembly 213 includes a first arm 2131 and a second arm 2132. A first end 21311 of the first arm 2131 is pivotally connected to the mounting base 211, a second end 21312 of the first arm 2131 is pivotally connected to the step base 212, a first end 21321 of the second arm 2132 is pivotally connected to the mounting base 211, and a second end 21322 of the second arm 2132 is pivotally connected to the step base 212.

The arm assembly 213 further includes a first pin shaft 2133, a second pin shaft 2134, a third pin shaft 2135 and a fourth pin shaft 2136. The first arm 2131 has an upper end and a lower end, the upper end of the first arm 2131 is pivotally connected to the mounting base 211 via the first pin shaft 2133, and the lower end of the first arm 2131 is pivotally connected to the step base 212 via the second pin shaft 2134. An upper end of the second arm 2132 is pivotally connected to the mounting base 211 via a third pin shaft 2135, and a lower end of the second arm 2132 is pivotally connected to the step base 212 via a fourth pin shaft 2136.

Specifically, the step base 212 includes a first step base lug 2121 and a second step base lug 2122 opposite to each other, and the second end 21312 of the first arm 2131 is clamped between the first step base lug 2121 and the second step base lug 2122. The second pin shaft 2134 sequentially passes through one of the first step base lug 2121 and the second step base lug 2122, the second end 21312 of the first arm 2131, and the other one of the first step base lug 2121 and the second step base lug 2122 to pivotally connect the second end 21312 of the first arm 2131 to the step base 212. The second end 21322 of the second arm 2132 is clamped between the first step base lug 2121 and the second step base lug 2122, and the fourth pin shaft 2136 sequentially passes through one of the first step base lug 2121 and the second step base lug 2122, the second end 21322 of the second arm 2132, and the other one of the first step base lug 2121 and the second step base lug 2122 to pivotally connect the second end 21322 of the second arm 2132 to the step base 212.

Figure 33:
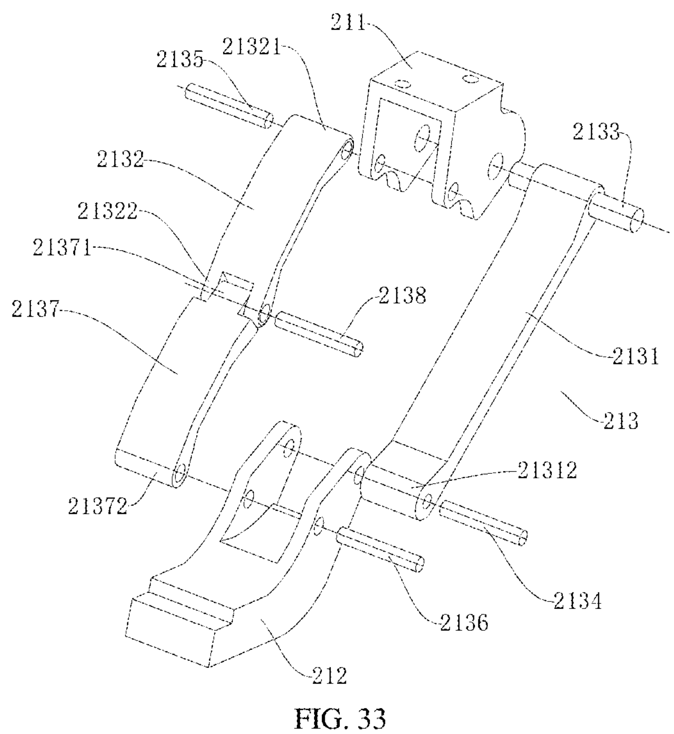
FIG. 33 showing another example of a linkage mechanism for a step device according to an embodiment of the present disclosure.

As shown in FIG. 33, the arm assembly 213 is a five-bar linkage. The arm assembly 213 includes a first arm 2131, a second arm 2132 and a third arm 2137. A first end 21311 of the first arm 2131 is pivotally connected to the mounting base 211, a second end 21312 of the first arm 2131 is pivotally connected to the step base 212, a first end 21321 of the second arm 2132 is pivotally connected to the mounting base 211, a first end 21371 of the third arm 2137 is pivotally connected to a second end 21322 of the second arm 2132, and a second end 21372 of the third arm 2137 is pivotally connected to the step base 212.

The arm assembly 213 further includes a first pin shaft 2133, a second pin shaft 2134, a third pin shaft 2135, a fourth pin shaft 2136 and a fifth pin shaft 2138. The first arm 2131 has an upper end and a lower end, the upper end of the first arm 2131 is pivotally connected to the mounting base 211 via the first pin shaft 2133, and the lower end of the first arm 2131 is pivotally connected to the step base 212 via the second pin shaft 2134. The second arm 2132 has an upper end and a lower end, and the upper end of the second arm 2132 is pivotally connected to the mounting base 211 via the third pin shaft 2135. The third arm 2137 has an upper end and a lower end. The lower end of the second arm 2132 is pivotally connected to the upper end of the third arm 2137 via the fifth pin shaft 2138, and the lower end of the third arm 2137 is pivotally connected to the step base 212 via the fourth pin shaft 2136.

Figure 34:
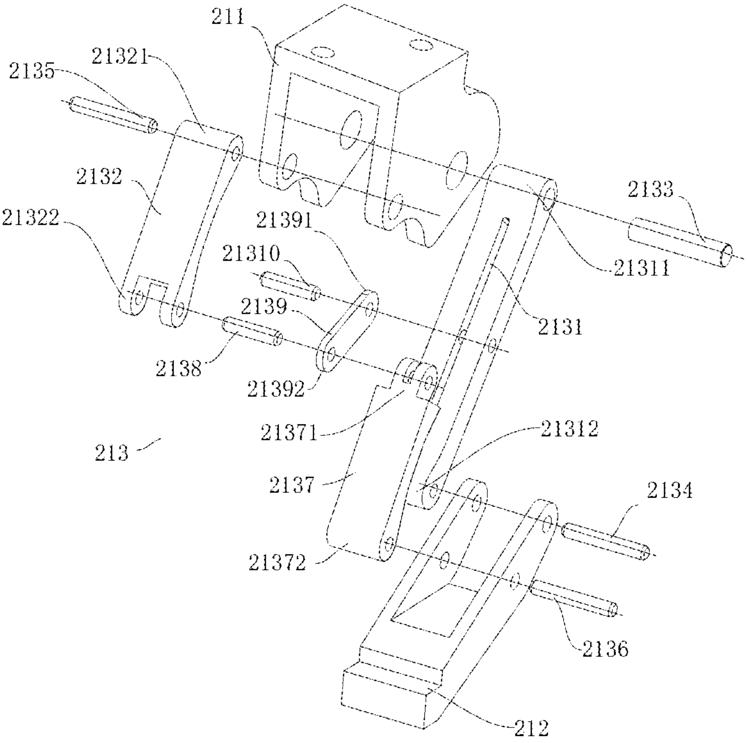
FIG. 34 showing another example of a linkage mechanism for a step device according to an embodiment of the present disclosure.

As shown in FIG. 34, the arm assembly 213 is a six-bar linkage. The arm assembly 213 includes a first arm 2131, a second arm 2132, a third arm 2137 and a fourth arm 2139. A first end 21311 of the first arm 2131 is pivotally connected to the mounting base 211, a second end 21312 of the first arm 2131 is pivotally connected to the step base 212, and a first end 21321 of the second arm 2132 is pivotally connected to the mounting base 211. A first end 21371 of the third arm 2137 is pivotally connected to a second end 21322 of the second arm 2132, a second end 21372 of the third arm 2137 is pivotally connected to the step base 212, a first end 21391 of the fourth arm 2139 is pivotally connected to the first arm 2131, and a second end 21392 of the fourth arm 2139 is pivotally connected to at least one of the second arm 2132 and the third arm 2137.

It may be understood by those skilled in the art that the second end 21392 of the fourth arm 2139 may be pivotally connected to the second arm 2132, may also be pivotally connected to the third arm 2137, and may also be pivotally connected to both the second arm 2132 and the third arm 2137.

As shown in FIG. 34, the arm assembly 213 further includes a first pin shaft 2133, a second pin shaft 2134, a third pin shaft 2135, a fourth pin shaft 2136, a fifth pin shaft 2138 and a sixth pin shaft 21310. The first arm 2131 has an upper end and a lower end. The upper end of the first arm 2131 is pivotally connected to the mounting base 211 via the first pin shaft 2133, and the lower end of the first arm 2131 is pivotally connected to the step base 212 via the second pin shaft 2134. The second arm 2132 has an upper end and a lower end. The upper end of the second arm 2132 is pivotally connected to the mounting base 211 via the third pin shaft 2135.

The third arm 2137 has an upper end and a lower end, and the lower end of the third arm 2137 is pivotally connected to the step base 212 via the fourth pin shaft 2136. The fourth arm 2139 has a first end and a second end. The first end of the fourth arm 2139 is pivotally connected to the lower end of the second arm 2132 and the upper end of the third arm 2137 via the fifth pin shaft 2138, and the second end of the fourth arm 2139 is pivotally connected to the middle of the first arm 2131 via the sixth pin shaft 21310.

In the arm assemblies 213 shown in FIGS. 33 and 34, the second end 21312 of the first arm 2131 is clamped between the first step base lug 2121 and the second step base lug 2122. The second pin shaft 2134 sequentially passes through one of the first step base lug 2121 and the second step base lug 2122, the second end 21312 of the first arm 2131, and the other one of the first step base lug 2121 and the second step base lug 2122 to pivotally connect the second end 21312 of the first arm 2131 to the step base 212. The second end 21372 of the third arm 2137 is clamped between the first step base lug 2121 and the second step base lug 2122, and the fourth pin shaft 2136 sequentially passes through one of the first step base lug 2121 and the second step base lug 2122, the second end 21372 of the third arm 2137, and the other one of the first step base lug 2121 and the second step base lug 2122 to pivotally connect the second end 21372 of the third arm 2137 to the step base 212.

In the description of the present disclosure, it should be understood that the orientation or position relationship indicated by the terms "center," "longitudinal," "transverse," "length," "width," "thickness," "up," "down," "front." "rear," "left." "right," "vertical," "horizontal," "top." "bottom," "inner," "outer," "clockwise," "counterclockwise," "axial," "radial," and "circumferential," or the like, is based on the orientation or position relationship shown in the accompanying drawings, which is only for the convenience of describing the present disclosure and simplifying the description, and does not indicate or imply that the referred device or element must have a specific orientation, and be constructed and operated in a specific orientation, so it cannot be understood as a limitation of the present disclosure.

In addition, the terms "first" and "second" are only used for purpose of description, and cannot be understood as indicating or implying relative importance or implicitly indicating the number of indicated technical features. Therefore, the feature defined as "first" or "second" may explicitly or implicitly include at least one such feature. In the description of the present disclosure, "a plurality of" means at least two, such as two, three, etc., unless otherwise specifically defined.

In the present disclosure, unless otherwise expressly defined, terms such as "install/mount," "interconnect," "connect," "fix" shall be understood broadly, and may be, for example, fixed connections, detachable connections, or integral connections: may also be mechanical or electrical connections or intercommunication: may also be direct connections or indirect connections via intervening media: may also be inner communications or interactions of two elements, unless otherwise specifically defined. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, terms such as "an embodiment," "some embodiments," "an example," "a specific example" or "some examples" means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are illustrative and shall not be understood as limitation to the present disclosure, and changes, modifications, alternatives and variations can be made in the above embodiments within the scope of the present disclosure by those skilled in the art.

What is claimed is:

1. A step, comprising a plurality of step segments, at least one connection step segment and a fastener, wherein adjacent step segments of the plurality of step segments comprise a first step segment and a second step segment, the connection step segment has a first end and a second end in a length direction of the connection step segment, the first end of the connection step segment is slidably and detachably connected to the first step segment, the second end of the connection step segment is slidably and detachably connected to the second step segment, and the fastener is configured to fasten the connection step segment and the first step segment and to fasten the connection step segment and the second step segment, wherein at least one of the plurality of step segments is hollow and has a longitudinal hole extending along a length direction of the step segment, and the connection step segment is hollow and has a connecting longitudinal hole extending along the length direction of the connection step segment, wherein the step is configured in at least one of a first configuration or a second configuration:

wherein, when configured in the first configuration, the first end of the connection step segment is slidably fitted in a longitudinal hole of the first step segment, the second end of the connection step segment is slidably fitted in a longitudinal hole of the second step segment, and an outer contour of a cross section of the connection step segment, a contour of a cross section of the connecting longitudinal hole, and a contour of a cross section of the longitudinal hole are polygons similar to each other, or wherein, when configured in the second configuration, an end of the first step segment and an end of the second step segment, which are opposite to each other, are slidably fitted in the connecting longitudinal hole, and an outer contour of a cross section of the step segment, a contour of a cross section of the longitudinal hole, and a contour of a cross section of the connecting longitudinal hole are polygons similar to each other.

2. The step according to claim 1, wherein an end of the first step segment and an end of the second step segment, which are opposite to each other, are spaced apart from each other, so that a gap is formed between the end of the first step segment and the end of the second step segment which are opposite to each other, to expose a portion of the connection step segment.

3. The step according to claim 1, wherein an end of the first step segment and an end of the second step segment, which are opposite to each other, abut against each other, so that a slit is formed between the end of the first step segment and the end of the second step segment which are opposite to each other.

4. The step according to claim 1, further comprising a decorative cover plate configured to cover a slit or a gap between the adjacent step segments, wherein the decorative cover plate is integrated or comprises a plurality of cover plate strips sequentially abutting against or connected with each other in the length direction of the connection step segment.

5. The step according to claim 1, further comprising a closure head, wherein the plurality of step segments comprise two end step segments, each of the two end step segments has a free end and a connecting end connected to the connection step segment, and the closure head is detachably mounted to the free end of the end step segment or is integrated with the end step segment.

6. The step according to claim 1, wherein the plurality of step segments comprise two end step segments, each of the two end step segments has a free end and a connecting end connected to the connection step segment, and an opening of the free end of the end step segment is blocked by a closure head.

7. The step according to claim 1, wherein the cross section of each of the longitudinal hole and the connecting longitudinal hole comprises a rectangular hole portion and a triangular hole portion or a trapezoidal hole portion located on an outer side of the rectangular hole portion, the step segment comprises a top wall, an inner side wall, an outer side wall and a bottom wall, and the bottom wall comprises a flat bottom wall section parallel to the top wall and an inclined bottom wall section extending upwards and outwards from the flat bottom wall section.

8. The step according to claim 1, wherein each of the plurality of step segments comprise a top wall, an inner side wall, an outer side wall, a bottom wall and an extension part extending from the top wall and an upper part of the inner side wall.

9. The step according to claim 8, further comprising a reinforcing slat and a locking slat, wherein the extension part has a groove therein, the reinforcing slat is fitted at least in the grooves of the adjacent step segments, and the locking slat is connected to the reinforcing slat by a threaded piece and is in contact with the inner side wall.

10. The step according to claim 1, wherein one of a step segment and the connection step segment comprises a sliding groove or a sliding hole, and an end of the other one of the step segment and the connection step segment is slidably fitted in the sliding groove or the sliding hole.

11. The step according to claim 1, wherein the fastener is a threaded member, a step segment has a fastening hole, the connection step segment has a connecting fastening hole, and the fastener is fitted in the fastening hole and the connecting fastening hole to fasten the step segment and the connection step segment.

12. The step according to claim 1, wherein two step segments are provided and one connection step segment is provided.

13. The step according to claim 12, further comprising a first closure head and a second closure head, wherein each of the two step segments is hollow and has a longitudinal hole extending along a length direction of the step segment, the connection step segment is hollow and has a connecting longitudinal hole extending along the length direction of the connection step segment, the first end of the connection step segment is slidably fitted in a longitudinal hole of the first step segment, the second end of the connection step segment is slidably fitted in a longitudinal hole of the second step segment, part of the first closure head is inserted in an opening of a free end of the first step segment to block the opening of the free end of the first step segment, part of the second closure head is inserted in an opening of a free end of the second step segment to block the opening of the free end of the second step segment, the first step segment and the second step segment are symmetrical with respect to a slit or a gap therebetween, and the first closure head and the second closure head are symmetrical with respect to the slit or the gap.

14. A step, comprising a plurality of step segments, at least one connection step segment and a fastener, wherein adjacent step segments of the plurality of step segments comprise a first step segment and a second step segment, the connection step segment has a first end and a second end in a length direction of the connection step segment, the first end of the connection step segment is slidably and detachably connected to the first step segment, the second end of the connection step segment is slidably and detachably connected to the second step segment, and the fastener is configured to fasten the connection step segment and the first step segment and to fasten the connection step segment and the second step segment, wherein at least one of the plurality of step segments is hollow and has a longitudinal hole extending along a length direction of the step segment, the first end of the connection step segment is slidably fitted in a longitudinal hole of the first step segment, and the second end of the connection step segment is slidably fitted in a longitudinal hole of the second step segment, wherein each of the plurality of step segments comprise a top wall, an inner side wall, an outer side wall, a bottom wall and an extension part extending from the top wall and an upper part of the inner side wall, wherein the step further comprises a decorative cover plate configured to cover a slit or a gap between the adjacent step segments, wherein the decorative cover plate comprises a top plate, an inner flange, and an outer flange, wherein the inner flange extends downwards and then outwards from an inner edge of the top plate and catches the extension parts of the adjacent two step segments, and the outer flange extends downwards and then inwards from an outer edge of the top plate and catches the bottom walls of the adjacent two step segments.

15. A step device, comprising:

a linkage mechanism; and a step comprising a plurality of step segments, at least one connection step segment and a fastener, wherein adjacent step segments of the plurality of step segments comprise a first step segment and a second step segment, the connection step segment has a first end and a second end in a length direction of the connection step segment, the first end of the connection step segment is slidably and detachably connected to the first step segment, the second end of the connection step segment is slidably and detachably connected to the second step segment, and the fastener is configured to fasten the connection step segment and the first step segment and to fasten the connection step segment and the second step segment, wherein the step is connected to the linkage mechanism to move between an extended position and a retracted position driven by the linkage mechanism, wherein at least one of the plurality of step segments is hollow and has a longitudinal hole extending along a length direction of the step segment, and the connection step segment is hollow and has a connecting longitudinal hole extending along the length direction of the connection step segment, wherein the step is configured in at least one of a first configuration or a second configuration:

wherein, when configured in the first configuration, the first end of the connection step segment is slidably fitted in a longitudinal hole of the first step segment, the second end of the connection step segment is slidably fitted in a longitudinal hole of the second step segment, and an outer contour of a cross section of the connection step segment, a contour of a cross section of the connecting longitudinal hole, and a contour of a cross section of the longitudinal hole are polygons similar to each other, or wherein, when configured in the second configuration, an end of the first step segment and an end of the second step segment, which are opposite to each other, are slidably fitted in the connecting longitudinal hole, and an outer contour of a cross section of the step segment, a contour of a cross section of the longitudinal hole, and a contour of a cross section of the connecting longitudinal hole are polygons similar to each other.

16. A vehicle, comprising a vehicle body and a step device, and the step device comprising:

a linkage mechanism; and a step comprising a plurality of step segments, at least one connection step segment and a fastener, wherein adjacent step segments of the plurality of step segments comprise a first step segment and a second step segment, the connection step segment has a first end and a second end in a length direction of the connection step segment, the first end of the connection step segment is slidably and detachably connected to the first step segment, the second end of the connection step segment is slidably and detachably connected to the second step segment, and the fastener is configured to fasten the connection step segment and the first step segment and to fasten the connection step segment and the second step segment, wherein the step is connected to the linkage mechanism to move between an extended position and a retracted position via the linkage mechanism, wherein the step device is mounted on at least one side of the vehicle body and/or a rear of the vehicle body, wherein at least one of the plurality of step segments is hollow and has a longitudinal hole extending along a length direction of the step segment, and the connection step segment is hollow and has a connecting longitudinal hole extending along the length direction of the connection step segment, wherein the step is configured in at least one of a first configuration or a second configuration:

wherein, when configured in the first configuration, the first end of the connection step segment is slidably fitted in a longitudinal hole of the first step segment, the second end of the connection step segment is slidably fitted in a longitudinal hole of the second step segment, and an outer contour of a cross section of the connection step segment, a contour of a cross section of the connecting longitudinal hole, and a contour of a cross section of the longitudinal hole are polygons similar to each other, or wherein, when configured in the second configuration, an end of the first step segment and an end of the second step segment, which are opposite to each other, are slidably fitted in the connecting longitudinal hole, and an outer contour of a cross section of the step segment, a contour of a cross section of the longitudinal hole, and a contour of a cross section of the connecting longitudinal hole are polygons similar to each other.

* * * * *